US012670413B2

(12) United States Patent
Timmons et al.

(10) Patent No.: US 12,670,413 B2
(45) Date of Patent: Jun. 30, 2026

(54) CLASSIFYING TEAMS IN A GROUP-BASED COMMUNICATION SYSTEM USING MACHINE LEARNING TECHNIQUES

(71) Applicant: Salesforce, Inc., San Francisco, CA (US)

(72) Inventors: Andy Timmons, Emeryville, CA (US); Lichen Ni, Vancouver (CA); Kyle Jablon, Long Island City, NY (US); William Cha, San Francisco, CA (US); Kate Kleinschmidt, Superior, CO (US)

(73) Assignee: Salesforce, Inc., San Francisco, CA (US)

( * ) Notice: Subject to any disclaimer, the term of this patent is extended or adjusted under 35 U.S.C. 154(b) by 786 days.

(21) Appl. No.: 18/150,482

(22) Filed: Jan. 5, 2023

(65) Prior Publication Data

US 2024/0232654 A1 Jul. 11, 2024

(51) Int. Cl.
*G06N 5/022* (2023.01)
*G06Q 30/0217* (2023.01)

(52) U.S. Cl.
CPC ......... *G06N 5/022* (2013.01); *G06Q 30/0217* (2013.01)

(58) Field of Classification Search
CPC ........................... G06N 5/022; G06Q 30/0217
USPC ....................................................... 705/346
See application file for complete search history.

(56) References Cited

U.S. PATENT DOCUMENTS

| | | | | |
|---|---|---|---|---|
| 2014/0229407 A1* | 8/2014 | White | .................... | G06N 20/00 706/46 |
| 2018/0101771 A1* | 4/2018 | Schwarm | ................. | G06N 5/01 |
| 2018/0287982 A1 | 10/2018 | Draeger et al. | | |
| 2018/0342004 A1* | 11/2018 | Yom-Tov | ............... | G06N 20/00 |
| 2021/0295736 A1* | 9/2021 | Baker | ................... | G06F 3/0482 |
| 2023/0353525 A1* | 11/2023 | Timmons | .............. | H04L 51/224 |

OTHER PUBLICATIONS

D. Maria-Iuliana, B. Constanta-Nicoleta and B. Alexandru, "Platform for Creating Collaborative E-Learning Communities Based on Automated Composition of Learning Groups," 2013 3rd Eastern European Regional Conference on the Engineering of Computer Based Systems, Budapest, Hungary, 2013, pp. 103-112, (Year: 2013).*

(Continued)

*Primary Examiner* — Wenren Chen
(74) *Attorney, Agent, or Firm* — Holland & Hart, LLP.

(57) ABSTRACT

Methods, systems, apparatuses, devices, and computer program products are described. A group-based communication system may use machine learning techniques to classify teams of the system, determine discount messaging for teams of the system, or both. The group-based communication system may receive concurrency data for a team of users and may input the concurrency data (e.g., with one or more other features associated with the team) into a machine learning model to generate a classifier for the team. The classifier may indicate whether the team is a work team, an educational team, or a social team. Based on the classifier for the team, the system may send a message to at least one user of the team (e.g., an administrative user). In some examples, the system may use another machine learning model to generate a discount message for sending to the at least one user based on the team classifier.

18 Claims, 10 Drawing Sheets

(56) References Cited

OTHER PUBLICATIONS

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online] [retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online] [retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

Team Classifier Manager

Concurrency Data Tracker

625

Input
Component

Classifier Model Component

630

Output
Component

610

615

Message Component

635

620

605

600

Receive concurrency data for a team of a group-based communication system

905

Generate, using a machine learning model, a classifier for the team

910

Send a message to at least one user of the team based on the classifier for the team

915

900

Determine a classifier for a team of a group-based communication system
1005

Generate, using a machine learning model, one or more aspects of a message based on the classifier for the team
1010

Send the message to at least one user of the team based on the one or more aspects of the message
1015

1000

CLASSIFYING TEAMS IN A GROUP-BASED COMMUNICATION SYSTEM USING MACHINE LEARNING TECHNIQUES

TECHNICAL FIELD

The present disclosure relates generally to communication systems and data processing, and more specifically to classifying teams in a group-based communication system using machine learning techniques.

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

Users may communicate information using a communication platform (e.g., a group-based communication system, separate from or associated with the cloud platform). In some examples, the group-based communication system may support different groups of users sharing content within specific channels. A group of users may use the group-based communication system for functions associated with a specific use case, such as a work use case, an educational use case, a social use case, or some other use case. However, if the group-based communication system fails to determine the specific use case for a group of users, the system may fail to provide messages, discount offers, or other features that optimize (or otherwise improve the performance or functionality of) the system for the specific use case.

SUMMARY

The described techniques relate to improved methods, systems, devices, and apparatuses that support classifying teams in a group-based communication system using machine learning techniques. A group-based communication system may support multiple groups or teams of users, where each team of users may leverage the group-based communication system for a specific use case. For example, a team of users communicating via the group-based communication system may be an example of a work team, an educational team, a social team, or some other classification of team. Accurately determining a classifier for a team of the group-based communication system may allow the system to provide messages, discount offers, or other features that optimize (or otherwise improve the performance or functionality of) the system for a use case corresponding to the team classifier.

The group-based communication system may leverage the concurrent nature of communications within the system to help determine team classifiers. For example, the system may store concurrency data for users of a team, where the concurrency data indicates when multiple users of the team are concurrently active in the group-based communication system. Different activity patterns for different teams may be correlated with different team classifiers. The group-based communication system may use machine learning techniques to predict a classifier for a team based on the team's concurrency data, other team information, user information for members of the team, or any combination thereof. For example, the group-based communication system may use a machine learning model to generate a classifier for a team in response to an input of one or more team-specific features (e.g., including the concurrency data). The group-based communication system may send a message to at least one user of a team (e.g., an administrative user of the team) based on the classifier for the team. For example, the system may send a message offering a discounted access plan for the team based on the team being classified as a work team or an educational team. Additionally, or alternatively, the group-based communication system may use a second machine learning model to determine one or more aspects of the message based on inputs to the second machine learning model (e.g., including, at least, the classifier for the team). For example, the second machine learning model may trigger sending a discount message to a team, may indicate a timing for sending the discount message, may generate or indicate contents for the discount message, or any combination thereof based on the classifier for the team.

One or more technical solutions described herein may solve one or more technical problems by providing an improved graphical user interface (GUI) with improved usability, functionality, and user experience, an improved set of features, improved messaging, or some combination thereof for teams of a group-based communication system. For example, the group-based communication system may use the determined team classifiers to tailor the user experience, provided features, marketing, or some combination thereof to specific teams. In some examples, the group-based communication system may provide improved security, data management (e.g., including data retention and backup), or both for work teams, improved collaborative features, data backup, or both for educational teams, and improved near-real-time functionality, video chat functionality, or both for social teams. In some cases, the group-based communication system may optimize—or otherwise improve—messaging of discount offers to teams to improve team retention, access plan purchases, or both. For example, the group-based communication system may market different access plans to work teams, educational teams, and social teams to improve a quantity of team-based subscriptions to paid access plans. Additionally, or alternatively, the group-based communication system may test or provide features to teams that are most likely to use the features. For example, features relating to effectively managing a relatively large quantity of channels (e.g., above a threshold quantity) may be provided to work teams, while features relating to improved personalization of user profiles may be provided to social teams. Such specialization of messages, features, or both may improve feature usage, user retention, and user experience across different types of teams for the group-based communication system. In some cases, a feature (e.g., improved security, such as stronger user authentication) may be desired by one type of team (e.g., a work team) but may negatively affect another type of team (e.g., a social team). In such cases, the group-based communication system may use the machine learning-based team classifications to improve the security for work teams (e.g., by providing the feature for work teams) without negatively affecting the experience for social teams (e.g., by deactivating the feature for social teams). Additionally, by using machine learning and multiple team features (e.g., such as concurrency data), the group-based communication system may improve the accuracy of team classifications, allowing the system to better allocate resources and features to the different types of teams.

DETAILED DESCRIPTION

Figure 1:
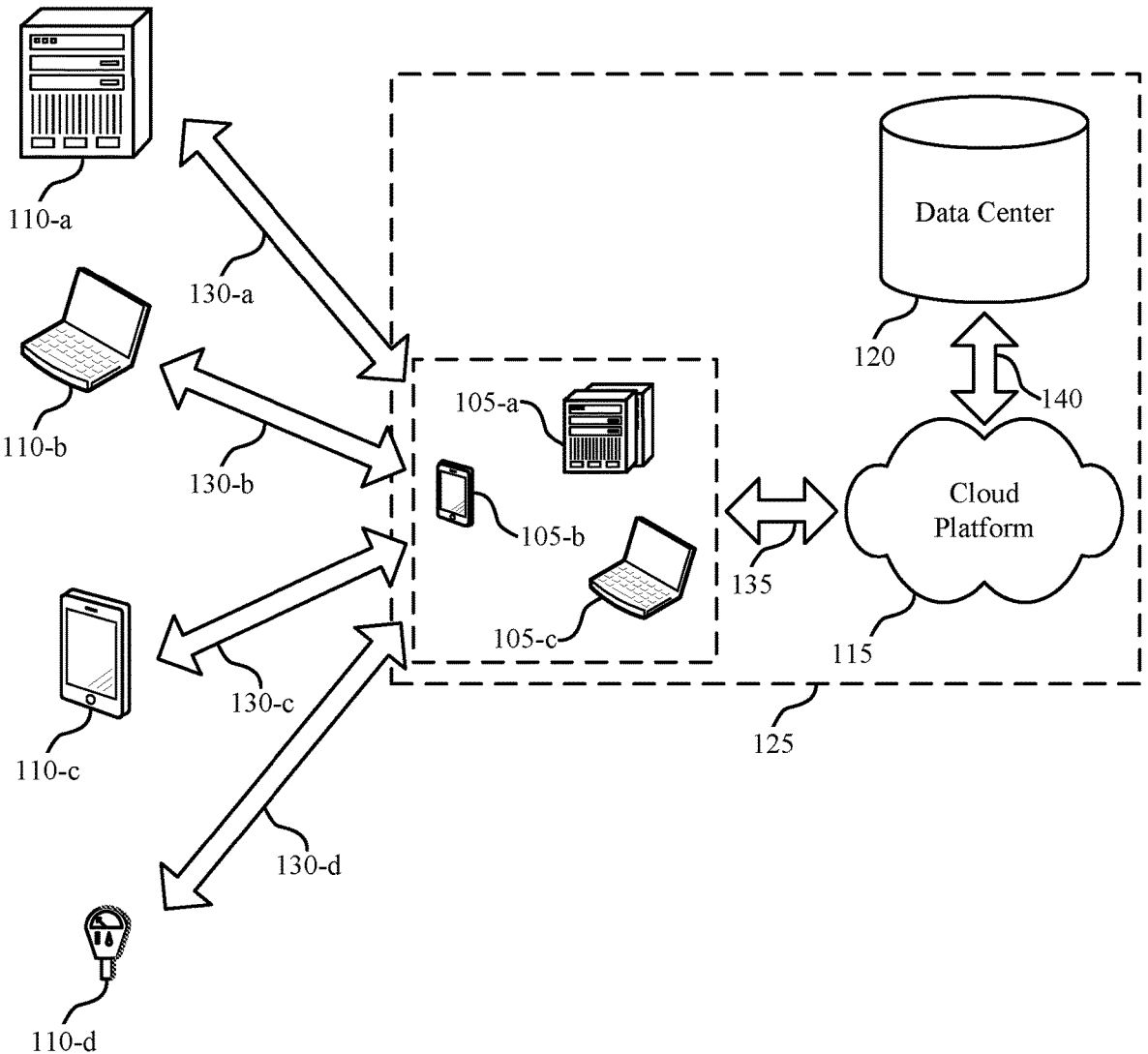
FIG. 1 illustrates an example of a system for cloud computing that supports classifying teams in a group-based communication system using machine learning techniques in accordance with aspects of the present disclosure.

A group-based communication system may provide access to a group-based communication platform, which may in turn support multiple group-based communication channels. A group-based communication channel may provide a virtual space in which users of a group or team may communicate, for example, by posting messages, entering hangout meetings, performing calls, sharing files, or communicating using any other means. In some systems, a workspace or organization (e.g., a tenant of a multi-tenant database system or another organization or team) may use multiple different channels within the group-based communication platform. A group or team of the group-based communication system (e.g., members of a specific workspace, members of a specific channel) may be associated with a specific type of classifier. For example, a team of the group-based communication system may be an example of a work team, an educational team, a social team, or some other classification of team. However, a team may not indicate its classification to the system. For example, if a user creates a team in the group-based communication system, the user may not indicate whether the team is a work team, an educational team, or a social team. Without such classification information, the group-based communication system may fail to provide features, offers, or other messaging relevant to the team.

Techniques described herein may support a group-based communication system using machine learning techniques to determine classifications for teams of users. In some examples, the group-based communication system may leverage the concurrent nature of communications within the system to help determine team classifiers. For example, the system may store concurrency data for users of a team, where the concurrency data indicates when multiple users of the team are concurrently active in the group-based communication system. The group-based communication system may use machine learning techniques to predict a classifier for a team based on the team's concurrency data, other team information, user information for members of the team, or any combination thereof. For example, the group-based communication system may input one or more team-specific features (e.g., representing the concurrency data or other team-specific information) into the machine learning model. In response, the machine learning model may generate a classifier for the team indicating whether the team is a work team, an educational team, a social team, or some other type of team. In some examples, the group-based communication system may store (e.g., transparent to users) team classifiers for teams communicating via the platform.

The group-based communication system may send a message to at least one user of a team (e.g., an administrative user of the team) based on the classifier for the team. For example, the system may send a message offering a discount for an access plan for the team based on the team being classified as a work team or an educational team. Additionally, or alternatively, the group-based communication system may use a second machine learning model to determine one or more aspects of the message based on inputs to the second machine learning model (e.g., including, at least, the classifier for the team). For example, the second machine learning model may trigger sending a discount message to a team, may indicate a timing for sending the discount message, may generate or indicate contents for the discount message, or any combination thereof. Using machine learning to determine discount messaging may improve the conversion rate for teams from free access plans to paid access plans by tailoring the discount messaging for specific types of teams.

Aspects of the disclosure are initially described in the context of a system for cloud computing. Additional aspects of the disclosure are described with reference to group-based communication systems and machine learning models. Aspects of the disclosure are further illustrated by and described with reference to process flows, apparatus diagrams, system diagrams, and flowcharts that relate to classifying teams in a group-based communication system using machine learning techniques.

FIG. 1 illustrates an example of a system 100 for cloud computing that supports classifying teams in a group-based communication system using machine learning techniques in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the system 100 may further support a group-based communication system. For example, a group-based communication system may provide a platform for users to communicate within groups or teams defined by group-based communication channels. The group-based communication system may leverage one or more aspects of the subsystem 125. For example, data objects stored in the data center 120, the cloud platform 115, or both may be accessed or otherwise referenced within a channel of the group-based communication system. Additionally, or alternatively, the cloud platform 115 may support a group-based communication platform.

A group-based communication system may use machine learning techniques to classify groups (or teams) within the group-based communication system. For example, the group-based communication system may store information defining a machine learning model for team classification. The machine learning model may receive, as inputs, one or more features corresponding to a team in the group-based communication system and may output a predicted classification for the team. The classification for the team may be a work team (e.g., a business or other organization using a group-based communication platform for work use cases), an educational team (e.g., a college or group of students using the group-based communication platform for a group project or other educational use case), a social team (e.g., a group of friends or colleagues using the group-based communication platform for chatting, organizing events, or any other social interactions or activities), or any combination of these or another classification (e.g., a governmental team, an activism team). The team classification may indicate how the users of the team are expected to use the group-based communication system.

Some other systems may classify groups of users into classifications. For example, a system may classify a group of users based on the users' email address domains (e.g., email addresses ending in ".edu" may cause such a system to classify a group of users as an educational group). However, such systems may fail to accurately determine team classifications. For example, a group of students with ".edu" email domains may use a group-based communication platform to communicate socially. Such other systems may classify this group of students as an educational team, even though the students use the group-based communication platform and interact in the group-based communication platform like a social team. As such, if a system classifies and treats the users as an educational team, the system may fail to optimize—or otherwise improve—the user experience for these users. For example, the system may offer group discounts to the users and may provide features relating to educational use cases (e.g., file sharing, handling of relatively large documents, improved backup files to ensure data protection), while the users may desire features relating to social use cases (e.g., additional features relating to video chats, emojis, and near-real-time notifications). Additionally, or alternatively, using email address domains may classify many teams as social teams, despite the teams actually being work teams, which may potentially lead to missed opportunities for growth of the system. Accordingly, the system may negatively affect the user experience for a group of users based on optimizing—or otherwise improving—the user experience for an incorrect use case (e.g., providing features for an educational use case, rather than for a social use case).

In contrast, the system 100 may use machine learning techniques and multiple features relating to a team in order to classify the team. For example, the system 100 may leverage one or more features specific to the group-based communication system to improve the accuracy of a team classification machine learning model. In some cases, the system 100 may use concurrency data for a team to predict a classification for the team. For example, the system 100 may store concurrency data indicating when multiple users of the team are concurrently active in the group-based communication system. This concurrency data may help distinguish between different classifications of teams. For example, teams of users that concurrently edit a shared document posted to a group-based communication channel may be more likely to be part of a work team or an educational team than a social team. Additionally, or alternatively, teams of users that are concurrently active in—and post frequently to—a channel for an hour around 7:00 p.m. at night may be more likely to be part of a social team than a work or educational team. The system 100 may use a machine learning model that predicts a team classification based on a diverse set of features to improve the accuracy of the team classification, effectively improving the confidence with which the system 100 may provide features and messages to users of teams. For example, the system 100 may offer group discounts and provide features that are relevant to a team of users based on correctly predicting the classification of the team of users. The machine learning model may additionally update as user or team behaviors change, updating the machine learning model to accurately classify teams even if team interactions with the group-based communication system change.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
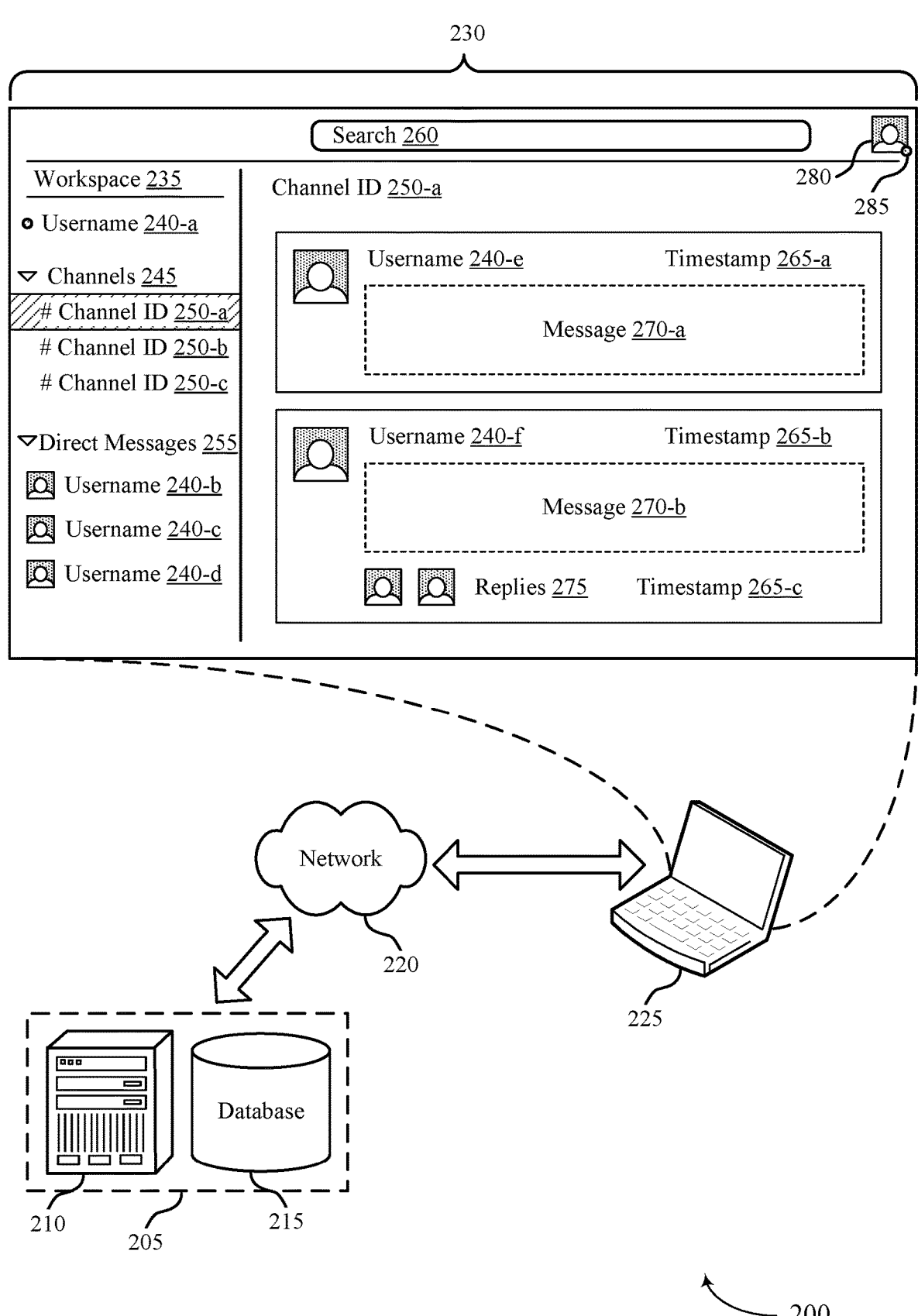
FIGS. 2 and 3 illustrate examples of group-based communication systems that support classifying teams using machine learning techniques in accordance with aspects of the present disclosure.

FIG. 2 illustrates an example of a group-based communication system 200 that supports classifying teams using machine learning techniques in accordance with aspects of the present disclosure. The group-based communication system 200 may be implemented as part of or with a system 100. For example, the group-based communication system 200 may leverage data stored at a cloud platform 115, a data center 120, or some combination thereof. The group-based communication system 200 may include a group-based communication platform 205 hosted by one or more computing devices 210, databases 215, or a combination thereof. The group-based communication system 200 may support displaying data to a user via a user interface (UI) 230 of a user device 225. In some examples, the user device 225 may communicate with the group-based communication platform 205 via a network 220. In some cases, the user device 225 may be an example of a cloud client 105 or a contact 110 in a system 100, as described with reference to FIG. 1.

The group-based communication platform 205 may leverage a network-based computing system to enable users of the group-based communication platform 205 to exchange data. By being "group-based," the platform may support communication channels, messages, virtual spaces, or a combination thereof organized into groups of users. The group-based communication platform 205 may include security policies or features that define access to resources (e.g., channels, messages) according to such groups. In some examples, the groups of users may be defined by group IDs, which may be associated with common access credentials, domains, or the like. In some examples, the group-based communication platform 205 may provide a virtual space enabling users to chat, meet, call, collaborate, transfer files or other data, or otherwise communicate within groups. In some examples, a group may be associated with a workspace 235, enabling users associated with the group to communicate within the group in a secure and private virtual space.

In some cases, members of a group or a workspace may be associated with a same organization (e.g., a tenant of a multi-tenant database system). In some other cases, members of a group or a workspace may be associated with different organizations (e.g., entities with different organization IDs, such as different tenants in a multi-tenant database system).

One or more computing devices 210 may support the group-based communication platform 205. For example, the one or more computing devices 210 may include an application server, a database server, a cloud-based server or service, a worker server, a server cluster, a virtual machine, a container, or any combination of these or other computing devices supporting data processing. For example, the one or more computing devices 210 may include one or more processors, memory, computer-readable media, or a combination thereof. The one or more computing devices 210 may perform functions and provide features as described herein with respect to the group-based communication platform 205. The group-based communication platform 205 may further include one or more databases 215, which may include cloud-based data storage, physical data storage, or both. In some cases, the one or more databases 215 may be memory components of the one or more computing devices 210. The one or more databases 215 may store data associated with the group-based communication platform 205. For example, the one or more databases 215 may include data relating to channels, users, workspaces 235, or any combination thereof, logs of messages 270, security information, or any other information relevant to the group-based communication platform 205.

A user may access the group-based communication platform 205 using a user device 225. The user device 225 may be an example of a laptop, a desktop computer, a smartphone, a tablet, a smart device, or any other device operated by a user and including a UI 230. The user device 225 may communicate with the group-based communication platform 205, for example, via a network 220. The network 220 may be any type of communication network, such as a local area network or a wide area network, the Internet, a wireless network, a cellular network, a local wireless network, Wi-Fi, Bluetooth®, Bluetooth Low Energy (BLE), Near Field Communication (NFC), a wired network, or any combination of these or other networks. The network 220 may support proper network protocols for transferring data between the user device 225 and the group-based communication platform 205. For example, the user device 225, the group-based communication platform 205, or both may apply one or more security protocols (e.g., encryption) for securely transferring data over the network 220. In some cases, one or more aspects of the group-based communication platform 205 may be implemented at the user device 225. For example, the user device 225 may download an application corresponding to the group-based communication platform 205 and may store information relating to the group-based communication platform 205 locally at the user device 225. In some other examples, the user device 225 may access the group-based communication platform 205 in a web browser.

The user device 225 may include a UI 230 that may display information relating to the group-based communication platform 205. Additionally, a user may interact with the UI 230 to communicate with other users, view data, modify data, or otherwise perform actions associated with the group-based communication platform 205. The group-based communication platform 205 may support multiple group-based communication channels, and the UI 230 may display information relating to a group-based communication channel corresponding to a channel ID 250-a. The UI 230 may display a sidebar including navigation information for a user and a central pane (e.g., a main pane) including the channel contents, such as a sequential listing of messages 270 corresponding to the channel ID 250-a. A channel (e.g., a group-based communication channel) may provide a virtual space for a group of users to communicate via messages, hangouts, video or audio calls, files, or any other means of communication. The group of users may include members of the channel, nonmembers of the channel with access to the channel, or both.

A user may log into the group-based communication platform 205 (e.g., using a username 240-a, a password, or both corresponding to a user account). In response to the user logging in, the group-based communication platform 205 may send, for display in the UI 230, data corresponding to the user (e.g., corresponding to an account for the user). For example, the user may be associated with a specific workspace 235, a set of channels 245, a set of connections, a set of threads, a set of direct messages 255, or any combination of these. The user device 225 may retrieve or otherwise access the relevant information for the user (e.g., based on the username 240-a or another user ID) and surface the information for display in the UI 230 according to a display format.

As an example, in a sidebar (e.g., a navigation pane), the UI 230 may display an indication of a workspace 235 corresponding to the user and the username 240-a of the user. The sidebar may further include indications of a set of channels 245 using the respective channel IDs. For example, the set of channels 245 may include the channels to which the user is a member. As illustrated, the set of channels 245 may include a first channel corresponding to a first channel ID 250-a, a second channel corresponding to a second channel ID 250-b, and a third channel corresponding to a third channel ID 250-c. It is to be understood that the set of channels 245 may include any quantity of channels for selection by the user. The user may select a channel from the listing of the set of channels 245, and the UI 230 may display the selected channel (e.g., the messages 270 associated with the selected channel) in the central pane. The sidebar may further include a set of direct messages 255 between the user with the username 240-a and one or more other users (e.g., in a DM group). For example, the set of direct messages 255 may include the usernames 240 (or nicknames) of the users communicating via direct messages with the user. In some examples, the list of users may include users added by the user with username 240-a, users who have current, ongoing direct message conversations with the user with username 240-a, or both. As illustrated, the set of direct messages 255 may include indications of a user with a first username 240-b, a user with a second username 240-c, and a user with a third username 240-d, although any quantity of users may be include in the set of direct messages 255. Selecting a username 240 from the set of direct messages 255 may cause the UI 230 to display a set of direct messages between the logged in user and the selected user or group of users in the central pane (e.g., direct messages that are stored in the system and displayed in a sequential order).

The central pane of the UI 230 may display the contents of a selected channel. For example, if the user selects a channel with a channel ID 250-a, the central pane may display the selected channel ID 250-a, as well as data corresponding to this selected channel ID 250-a. The data for the channel may include a sequential listing of messages 270 posted to the channel. For example, a user with a username 240-*e* may post a first message 270-*a* at a first time corresponding to a timestamp 265-*a*. The UI 230 may display, for the channel, this information, as well as affordances supporting actions associated with this information. For example, a user may react to the message 270-*a*, reply to the message 270-*a*, or both. As illustrated, another user with a username 240-*f* may post a second message 270-*b* at a time corresponding to a timestamp 265-*b*, and one or more users may reply to the message 270-*b*. The UI 230 may indicate a set of replies 275 and one or more timestamps 265-*c* associated with the replies 275 (e.g., a timestamp 265-*c* corresponding to a most recent reply) with the message 270-*b*. Selecting the set of replies 275 may cause the UI 230 to display the replies in a second sidebar (e.g., as a thread of messages).

The messages 270 may include text or other objects, such as files, photos, audio files, video files, documents, uniform resource locator (URL) links, or any other objects. If the selected channel is private, member of the channel may view the information related to the channel, while nonmembers of the channel may be blocked from viewing the information. If the selected channel is public, members and nonmembers of the channel may view the relevant information. In some cases, channels, users, workspaces 235, accounts, or some combination thereof may include accessibility settings or rules with may define viewing capabilities, editing capabilities, or both.

The UI 230 may further support search functionality using a search bar 260. Additionally, or alternatively, the UI 230 may indicate a profile picture 280 of the currently logged in user, as well as a connection status 285 (e.g., online, offline, busy) of the user.

The group-based communication system 200 may support specific groups or "teams" of users at one or more granularity levels. For example, the members of a group-based communication channel (e.g., associated with a channel ID 250-*a*) may correspond to a team, the members of a workspace 235 may correspond to a team, the members of an organization or tenant of a multi-tenant database system may correspond to a team, the members of a direct messaging group may correspond to a team, or the group-based communication platform 205 may support any combination of these or other groupings of users into teams. In some cases, a user may be a member of a single team. In some other cases, a user may be a member of multiple different teams (e.g., multiple different channels, multiple different groups). A team of the group-based communication platform 205 may be associated with a specific access plan level, a specific set of features, or both. For example, an administrative user for the team may sign the team up for an access plan, such as a free plan, a Pro plan, a business plan, an enterprise plan, or any other access plan supported by the group-based communication platform 205. In some cases, different access plans may correspond to different prices (e.g., monthly or annual rates), which may be further based on a quantity of users associated with a team. The currently active access plan for a team may define a set of features that the group-based communication platform 205 provides for members of the team. For example, a first user of a first team with a first access plan may have access to specific security features, integration features, workflow builders, data management tools, customization options, or any combination of these or other features. However, such features may be inaccessible to a second user of a second team with a second, different access plan.

The group-based communication platform 205 may use one or more machine learning techniques to determine information relating to teams. For example, the group-based communication platform 205 may use a machine learning model to classify teams as either work teams, educational teams, or social teams. The group-based communication platform 205 may leverage the team classifications to improve team-specific user experiences. For example, the group-based communication platform 205 may provide different features, present different UI layouts, or both for teams with different classifications. Additionally, or alternatively, the group-based communication platform 205 may send different messages to users associated with different team classifications. For example, the group-based communication platform 205 may offer different access plan discounts to members of teams with different team classifications. Accordingly, the group-based communication platform 205 may improve the user experience for a first workspace 235 corresponding to a work team, while concurrently improving the user experience for a second workspace 235 corresponding to a social team, despite the users of the different workspaces 235 using the group-based communication platform 205 in different ways. That is, the group-based communication platform 205 may optimize—or otherwise improve—one or more aspects of the group-based communication system 200 for multiple different types of teams depending on the specific classifications of the teams.

Figure 3:
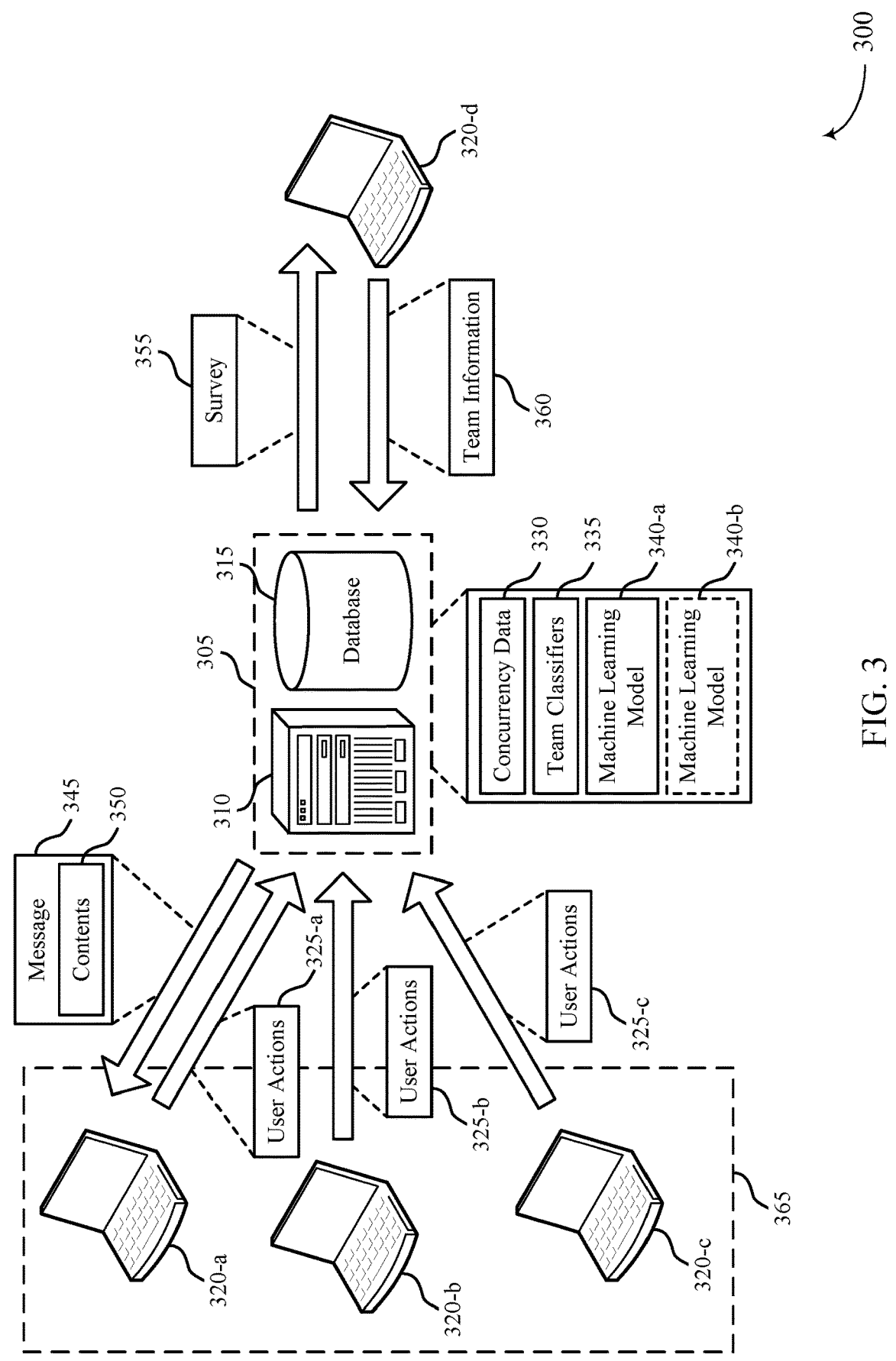

FIG. 3 illustrates an example of a group-based communication system 300 that supports classifying teams using machine learning techniques in accordance with aspects of the present disclosure. The group-based communication system 300 may be an example of a system 100, a group-based communication system 200, or both, as described herein with reference to FIGS. 1 and 2. For example, the group-based communication system 300 may include a group-based communication platform 305 hosted by one or more computing devices 310, databases 315, or a combination thereof. The group-based communication system 300 may support displaying data or other information relating to the group-based communication platform 305 at one or more user devices, such as a user device 305-*a*, a user device 305-*b*, a user device 305-*c*, and a user device 305-*d*. The group-based communication platform 305, the computing device 310, the database 315, and the user devices may be examples of corresponding devices described herein with reference to FIG. 2. Additionally, or alternatively, in some examples, a user device may be an example of a cloud client 105 or a contact 110 in a system 100, as described herein with reference to FIG. 1. The group-based communication system 300 may use one or more machine learning models to determine classifiers for teams 365 within the group-based communication system 300, to generate messages 345 for sending to users within the group-based communication system 300, or both.

Users associated with a group or team 365 may interact with one or more aspects or features of the group-based communication platform 305. For example, users of a workspace defined within the group-based communication platform 305 may communicate via group-based communication channels associated with the workspace, direct messages associated with the workspace, shared files within the workspace, or any combination thereof. A first user may perform a first set of user actions 325-*a* within the workspace via a first user device 320-*a*, a second user may perform a second set of user actions 325-*b* within the workspace via a second user device 320-*b*, and a third user may perform a third set of user actions 325-*c* within the workspace via a third user device 320-*c*. The user actions may include typing or posting messages, reacting or responding to messages, selecting to view group-based communication channels (e.g., channels, pages, direct messages), scrolling within group-based communication channels, selecting to view user profiles, selecting links, creating group-based communication channels, interacting with files, selecting an application window of the group-based communication platform 305, or any combination of these or other user actions within the group-based communication system 300.

The group-based communication platform 305 may store concurrency data 330 for the users based on the user actions. For example, the group-based communication platform 305 may store data (e.g., logs) tracking the user actions for the users and may generate concurrency data 330 based on the user data. The group-based communication system 300 may use concurrency data 330 based on the group-based communication system 300 supporting environments where groups of users may concurrently access shared resources (e.g., a shared channel, a shared document). For example, the group-based communication system 300 may leverage the synchronous nature of communications within the group-based communication platform 305 to learn about how teams communicate via the group-based communication platform 305. The concurrency data 330 may indicate when multiple users of a team 365 are concurrently active in the group-based communication platform 305, how the multiple users interact with other users within the group-based communication system 300, or some combination thereof. For example, the concurrency data 330 may indicate when the first user operating the first user device 320-a, the second user operating the second user device 320-b, and the third user operating the third user device 320-c are concurrently active (e.g., performing user actions) within group-based communication system resources for the team 365.

The concurrency data 330 may be correlated to a function of the team 365. For example, how the users interact within the group-based communication platform 305 may potentially indicate whether the team 365 is a work team, an educational team, a social team, or some other classification of team. For example, if a significant proportion of a team 365 (e.g., above a threshold) is concurrently active during regular working hours, the concurrency data 330 may indicate that the team is likely a work team. The group-based communication system 300 may use team-specific data, such as the concurrency data 330, with machine learning techniques to predict a classifier for the team 365.

In some examples, the group-based communication system 300 may use a first machine learning model 340-a for team classification. The first machine learning model 340-a may be trained to predict a team classifier 335 based on one or more features associated with a team. In some cases, the first machine learning model 340-a may be trained offline and deployed for the group-based communication platform 305. Additionally, or alternatively, the first machine learning model 340-a may be trained online (e.g., during system downtime, during periods with relatively low processing resource usage). The first machine learning model 340-a may be trained based on survey data. For example, the group-based communication system 300 may send surveys 355 to one or more users (e.g., administrative users) associated with one or more teams. The surveys 355 may request team-specific information, including a team-specified classifier (e.g., indicating a work classification, an educational classification, or a social classification) for the team. The group-based communication system 300 or another system supporting machine learning may train the first machine learning model 340-a using the survey responses, including the team-specified classifiers. For example, the group-based communication system 300 may send the survey 355 to a user operating the user device 320-d and associated with a team. The user (e.g., an administrative user for the team) may respond to the survey 355 with team information 360, including a team-specified classifier for the team. The group-based communication system 300 or another machine learning system may use the team-specified classifier, as well as other information stored for the team (e.g., for the group-based communication platform 305, such as the concurrency data 330) to train the first machine learning model 340-a to predict team classifiers based on some set of team-specific information. The group-based communication platform 305 may store team classifiers 335, such as team-specified classifiers (e.g., in response to surveys 355), model-generated classifiers, or both.

The group-based communication system 300 may predict classifiers for new teams, teams that refrain from providing team-specified classifiers, or both. For example, the team 365 may correspond to a new workspace created for the group-based communication system 300. The team 365 may include the users operating the user device 320-a, the user device 320-b, and the user device 320-c. The group-based communication system 300 may use the user actions performed by the users within the workspace, corresponding concurrency data 330, other team information (e.g., security settings), other user information, or any combination thereof as input features to the machine learning model 340-a. The machine learning model 340-a may output a prediction of the team classifier 335 for the team 365. For example, the machine learning model 340-a may predict whether the team 365 is a work team, an educational team, or a social team. In some cases, the machine learning model 340-a may additionally provide a level of confidence associated with the prediction. The team classification may be transparent to users of the group-based communication system 300. For example, the group-based communication system 300 may predict and store team classifiers 335 for internal use without surfacing the team classifiers 335 to users of the corresponding teams.

In some examples, the group-based communication system 300 may use the team classifiers 335 to determine how to message discounts offers, advertisements, training materials, or other messages 345 to teams within the group-based communication system 300. For example, the group-based communication system 300 may train a machine learning model to output one or more aspects relating to a message 345 for teams. In some cases, the first machine learning model 340-a may provide additional outputs relating to one or more messages 345 to send to teams. In some other cases, the group-based communication system 300 may use an additional machine learning model 340-b to determine the one or more aspects relating to the messages 345. Such a machine learning model 340-b may use at least the team classifier 335 as an input feature for determining the one or more aspects relating to a message 345.

In some examples, the message 345 may be a discount offer to a team 365 (e.g., the administrative user of a team). The discount offer may offer one or more discounts for one or more access plans. The user may purchase an access plan for the team 365 using a discount offered via the message 345. In some cases, the machine learning model 340-b may indicate a time to send a message 345 offering a discount. For example, rather than sending discount offers according to a set time schedule (e.g., two weeks after creation of a team, which in some cases may reduce growth or opportunities for team retention), the group-based communication system 300 may determine when to send a discount offer using the machine learning model 340-b to optimize the likelihood of a team purchasing an access plan (e.g., using the discount). Additionally, or alternatively, the machine learning model 340-b may indicate contents 350 for the message 345. For example, the machine learning model 340-b may determine which discount(s) to offer to a team. To develop the group-based communication system 300, the system may offer different discounts or deals to different types of teams (e.g., to promote growing work and educational usage). In some cases, the machine learning model 340-b may trigger whether or not to offer a discount to a team. The group-based communication system 300 may offer the discount to an administrative user of a team 365 (e.g., the user who created the team 365, the user who is listed as the administrator for the team 365). For example, the group-based communication system 300 may send the message 345 offering the discount to the administrative user operating the user device 320-a.

In some other examples, the message 345 may be a training message (e.g., a message 345 providing information regarding a specific feature of the group-based communication platform 305). The machine learning model 340-b may determine whether to send a training message to a team based on one or more aspects of the team (e.g., the team classifier 335). For example, the group-based communication platform 305 may send a training message relating to data security to users of a work team but may refrain from sending this training message to users of a social team.

Additionally, or alternatively, the message 345 may be associated with a test (e.g., an A/B test or other test) performed by the group-based communication system 300. For example, the system may obtain more accurate A/B testing results based on tracking team classifiers 335 and determining A/B testing results for different types of teams. In some examples, the system may perform a test specifically for one type of team (e.g., testing a new feature for work teams based on the team classifiers 335).

In some systems, the second machine learning model 340-b may be trained using random (or pseudo-random) discount offers. In some cases, the second machine learning model 340-b may be trained offline and deployed for the group-based communication platform 305. Additionally, or alternatively, the second machine learning model 340-b may be trained online (e.g., during system downtime, during periods with relatively low processing resource usage). The group-based communication system 300 or another machine learning system may randomly (or pseudo-randomly) offer discounts to users, teams, or both. The group-based communication system 300 may track the results of offering these discounts. For example, the group-based communication system 300 may store data indicating which teams used which discounts, and the second machine learning model 340-b may be trained using this data and features associated with teams. In some cases, the group-based communication system 300 or another machine learning system may continue to periodically or aperiodically send random or pseudo-random discount offers to users or teams to continue training the second machine learning model 340-b. Additionally, or alternatively, the second machine learning model 340-b may be trained based on a feedback loop using the messages 345 sent offering discounts. The second machine learning model 340-b may be trained to optimize—or otherwise improve—the likelihood that a discount message sent to a team 365 will result in the team 365 purchasing an access plan for the group-based communication platform 305.

Figure 4A:
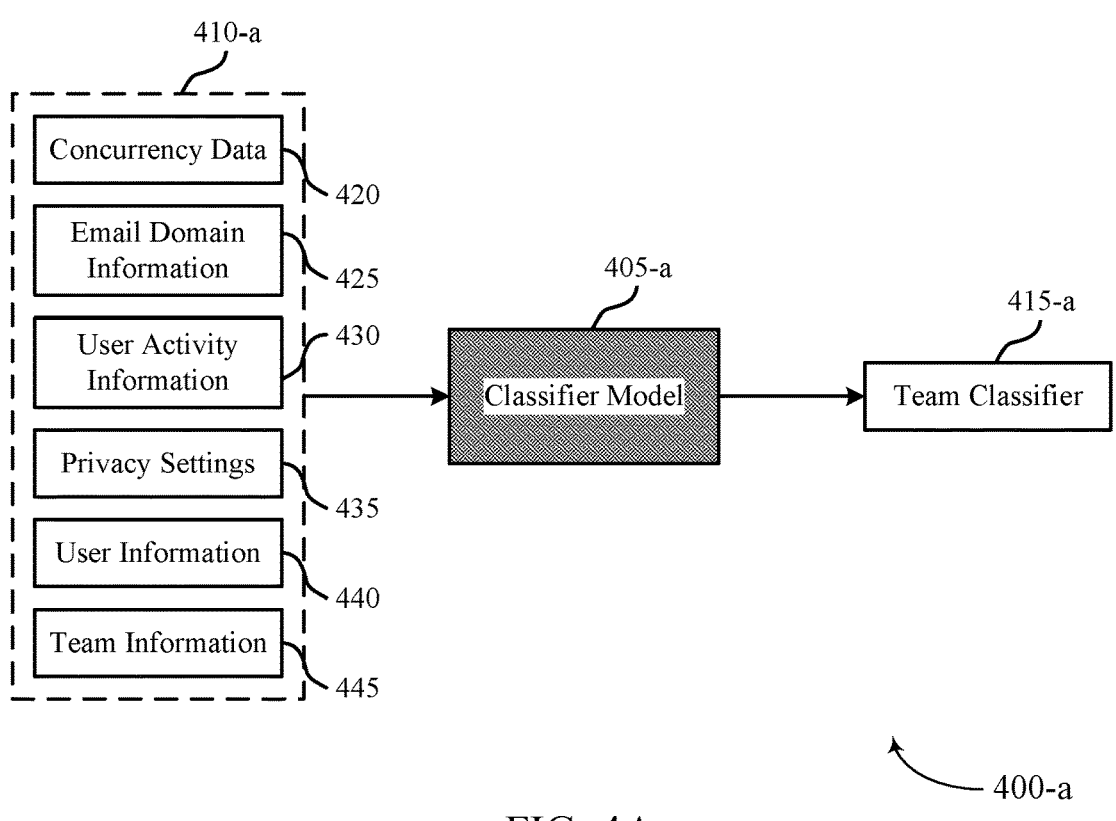
FIGS. 4A and 4B illustrate examples of machine learning models that support classifying teams and determining discount messaging in group-based communication systems using machine learning techniques in accordance with aspects of the present disclosure.
Figure 4B:
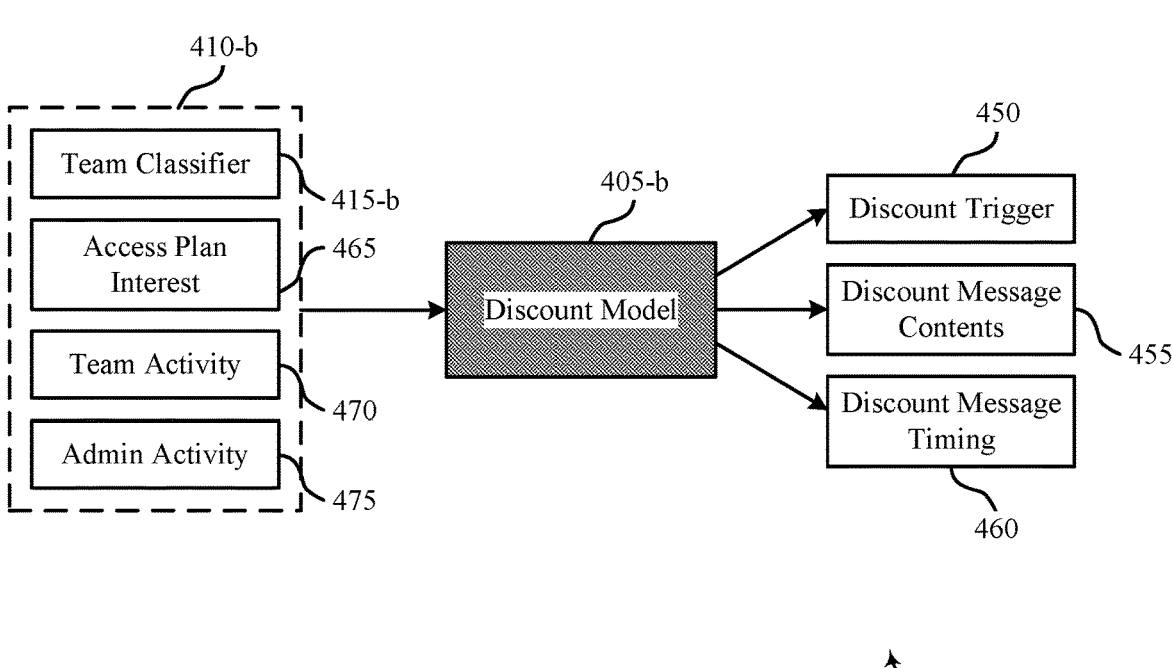

FIGS. 4A and 4B illustrate examples of machine learning models that support classifying teams and determining discount messaging in group-based communication systems using machine learning techniques in accordance with aspects of the present disclosure. FIG. 4A illustrates an example of a machine learning model 400-a that supports classifying teams in a group-based communication system in accordance with aspects of the present disclosure. The machine learning model 400-a may be implemented by a group-based communication system and may be an example of a machine learning model 340-a as described herein with reference to FIG. 3. The machine learning model 400-a may be trained to accept a set of features 410-a as inputs to a classifier model 405-a and may output a team classifier 415-a in response to the input set of features 410-a.

The machine learning model 400-a may be trained by the group-based communication system or by some other machine learning system. The machine learning model 400-a may be an example of a logistic regression model, a classification model, a random forest model, a neural network (e.g., a feed forward (FF) or deep feed forward (DFF) neural network, a recurrent neural network (RNN), a long/short term memory (LSTM) neural network, or any other type of neural network), or some other type of machine learning model or heuristic.

The group-based communication system or other machine learning system may use any quantity of features (e.g., corresponding to the set of features 410-a to be used as inputs to the model) to train the machine learning model 400-a. In some cases, the system training the model may iteratively test additional or alternative features to determine how the features affect the accuracy of the machine learning model 400-a. The system may leverage the significant quantity of teams, users, and activities associated with the group-based communication system to test features and train or retrain the machine learning model 400-a. In some cases, the system may refrain from deploying the machine learning model 400-a until the model has reached a threshold confidence metric.

The system may train the machine learning model 400-a using concurrency data 420 from one or more concurrency tables (e.g., data indicating when users are concurrently active in the group-based communication system). In some examples, the system may access and aggregate concurrency data for a specific time window (e.g., the last seven days, to support up-to-date optimization). Other potential features may be used to train one or more machine learning models for team classification, message generation, or both.

The set of features 410-a used to train the classifier model 405-a, used as inputs to the trained classifier model 405-a, or both may include any quantity of features associated with a team. In some examples, the set of features 410-a may include concurrency data 420 for the team. The concurrency data 420 may indicate when users of the team are concurrently active in the group-based communication system (e.g., concurrently posting to a channel, concurrently collaborating on a document, concurrently participating in a meeting). The concurrency data 420 may indicate whether the team is relatively highly active (e.g., based on actions performed by users of the teams, time spent interacting with the group-based communication system by users of the team, or both).

In some examples, the set of features 410-a may include email domain information 425 for members of the team.

Additionally, or alternatively, the set of features 410-a may include user activity information 430. In some cases, the user activity information 430 may additionally or alternatively include time spent data indicating user time spent performing different operations in the group-based communication system (e.g., reading posts, posting messages, collaborating on a document, participating in a meeting or on a call). The user activity information 430 may include pricing page visits by the user, checkout page visits by the user, whether the user abandoned a shopping cart, or any other information indicating that the user previously considered purchasing an access plan (e.g., a specific access plan or any non-free access plan) for the team. Additionally, or alternatively, the user activity information 430 may indicate message behavior (e.g., lengths of messages, whether messages include emojis) or file usage by the users, such as the types of files typically used by the users (e.g., teams using relatively more word processing files may be more likely to be work or educational teams, while teams using relatively more images and videos may be more likely to be social teams). In some cases, the set of features 410-a may specifically include user activity information 430 for an administrative user of the team (e.g., a user in charge of selecting the access plan for the team).

In some examples, the set of features 410-a may include privacy settings 435 for the team. For example, the classifier model 405-a may determine the team classifier 415-a based in part on whether a channel for the team is public (e.g., possibly indicating a social team) or private (e.g., possibly indicating a work team). In some examples, the set of features 410-a may include other user information 440. For example, the other user information 440 may indicate whether users of a team are new users to the group-based communication system or if the users were previously members of other teams or channels. Additionally, or alternatively, the set of features 410-a may include other team information 445. For example, the other team information 445 may indicate a previous or current access plan for the team (e.g., if the team is or was paying for specific features supported by the group-based communication system).

The output of the classifier model 405-a may indicate the team classifier 415-a for the team (e.g., whether the team is a work team, an educational team, or a social team), a confidence in the classification (e.g., a percentage value, a decimal value), or both. The predicted team classifier 415-a may be used to improve the user experience for members of the team by allowing the group-based communication system to tailor the user experience to the specific team classification.

FIG. 4B illustrates an example of a machine learning model 400-b that supports determining discount messaging in a group-based communication system in accordance with aspects of the present disclosure. The machine learning model 400-b may be implemented by a group-based communication system and may be an example of a machine learning model 340-b as described herein with reference to FIG. 3. The machine learning model 400-b may be trained to accept a set of features 410-b as inputs to a discount model 405-b and may output an indication of a discount trigger 450, discount message contents 455, an indication of discount message timing 460, or any combination thereof in response to the input set of features 410-b. The machine learning model 400-b may be an example of any type of machine learning model or heuristic (e.g., similar to the machine learning model 400-a) and may be trained in accordance with a process similar to the process described herein with reference to FIG. 4A.

The set of features 410-b used to train the discount model 405-b, used as inputs to the trained discount model 405-b, or both may include any quantity of features associated with a team. In some examples, the set of features 410-b may include a team classifier 415-b for the team. In some cases, a team classifier 415-a predicted by a classifier model 405-a may be input into the discount model 405-b to determine information for a discount message. The team classifier 415-b may indicate that a team is a work team, an educational team, or a social team.

In some examples, the set of features 410-b may include access plan interest information 465 for a user or a team. For example, if a user or a team indicates interest in purchasing an access plan (e.g., by visiting a pricing page, adding an access plan to a virtual shopping cart but abandoning the virtual shopping cart before completing the purchase), the discount model 405-b may prioritize discounts for the user or team. Additionally, or alternatively, the set of features 410-b may include team activity information 470, administrative user activity information 475, or both. For example, how a team or an administrative user uses the group-based communication system may impact whether the discount model 405-b determines to offer discounts to the team. Accordingly, teams may be offered discounts based on how the teams actually use the group-based communication system.

The output of the discount model 405-b may indicate one or more aspects associated with a message (e.g., a message offering a discount). In some examples, the output of the discount model 405-b (e.g., a binary classification model) may be a binary value indicating whether or not to offer a discount to a team. Such a binary classification model may trigger sending a discount message via a discount trigger 450 and may support targeting discounts at specific types of teams or users. In some other examples, the output of the discount model 405-b (e.g., a multi-label classification model) may indicate a discount bucket for a team or user (e.g., indicating which discount to offer, indicating an amount to discount a purchase), an estimated propensity for the team or user to pay for system features of the group-based communication system, or both. Such a multi-label classification model may indicate discount message contents 455 (e.g., what discount to offer), discount message timing 460 (e.g., when to send the discount message), or both.

Figure 5:
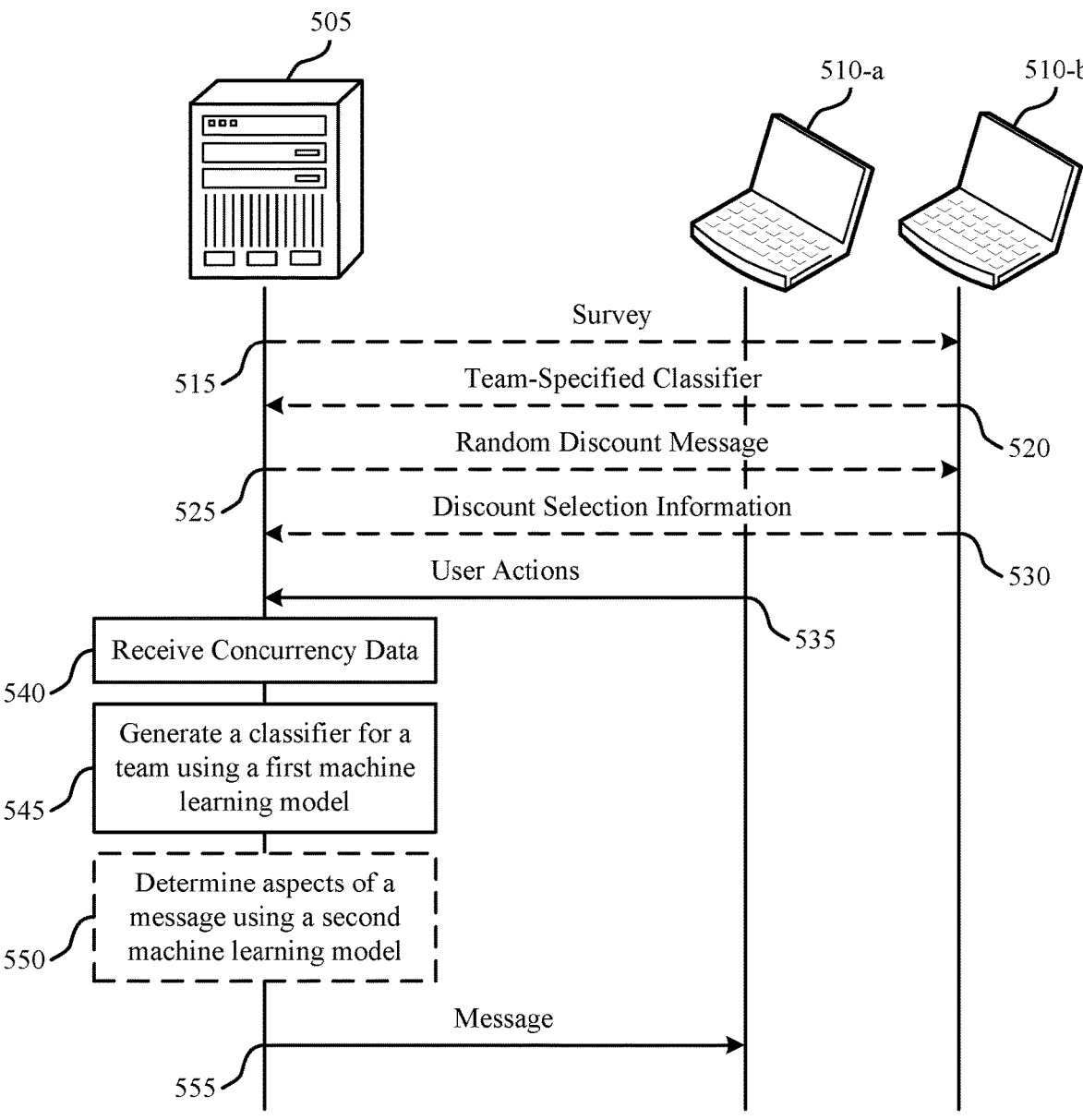
FIG. 5 illustrates an example of a process flow that supports classifying teams in a group-based communication system using machine learning techniques in accordance with aspects of the present disclosure.

FIG. 5 illustrates an example of a process flow 500 that supports classifying teams in a group-based communication system using machine learning techniques in accordance with aspects of the present disclosure. The process flow 500 may be implemented by a group-based communication system including one or more computing devices 505 and one or more user devices, such as a user device 510-a and a user device 510-b. The computing device 505 (e.g., a processing device or system) may host a group-based communication platform. The computing device 505 may be an example of an application server, a database server, a cloud-based server or service, a worker server, a server cluster, a virtual machine, a container, a network device, a user device, or any combination of these or other computing devices or systems. The user devices may access the group-based communication platform over a network, based on downloading an application, or both. The user devices may be examples of laptops, desktop computers, mobile devices, smartphones, smartwatches, tablets, virtual reality (VR) devices, or any combination thereof. The user devices may include UIs (e.g., GUIs) that can present information (e.g., visually, audibly) corresponding to the group-based communication system, as described herein with reference to FIGS. 1 through 4B. Alternative examples of the following may be implemented, where some processes are performed in a different order than described or are not performed at all. In some examples, processes may include additional features not mentioned below, or further processes may be added. Additionally, or alternatively, one or more operations described herein as performed by the computing device 505 may instead be performed by a user device, for example, if the user device runs a group-based communication platform application locally.

The computing device 505, the user device 510-a, the user device 510-b, or any combination thereof may run the group-based communication system platform. A user device may display, via a UI, one or more visual panes including information relating to the group-based communication platform, as described herein with reference to FIG. 2. A user operating the user device 510-a may be associated with a first team within the group-based communication system, and a user operating the user device 510-b may be associated with a second team within the group-based communication system. For example, the group-based communication system may store records associating user identifiers (e.g., corresponding to users of the group-based communication platform) with team identifiers (e.g., corresponding to groups or teams within the group-based communication platform, such as workspaces, channels, or other groups).

In some examples, at 515, the computing device 505 may send, to a set of users (e.g., administrative users, team creators) corresponding to a set of teams of the group-based communication system, a survey message requesting information relating to classifications of the teams. For example, the survey message may ask whether a team is primarily associated with work (e.g., a business), education (e.g., a school, college, or group of classmates), or social communications (e.g., a group of friends or relatives). For example, the computing device 505 may send the survey message to the user device 510-b. The survey message may be an example of a message or notification within the group-based communication system, an email message, a text message, or any other type of electronic communication. At 520, the user operating the user device 510-b may respond to the survey message for a team corresponding to the user. For example, the user may indicate, via the survey, whether the user's team is a work team, an educational team, or a social team. The computing device 505 may receive, in response to the survey message, information relating to the classification of the user's team based on the user's response. The computing device 505 may aggregate survey responses from users corresponding to multiple different teams and may use these team-specified classifiers to train a machine learning model.

In some examples, at 525, the computing device 505 may send random or pseudo-random discount offers to teams to gather discount training data for a machine learning model. For example, the computing device 505 may determine a subset of teams of the group-based communication system based on a random selection procedure. The computing device 505 may send, to a set of users corresponding to the determined subset of teams, one or more discount messages offering discounts to the users' respective teams. At 530, the computing device 505 may collect data based on whether the teams use the offered discounts in response to the discount messages and may use the collected data to train a discount machine learning model.

At 535, users may perform actions within the group-based communication system. At 540, the computing device 505 may receive—or otherwise determine—concurrency data for multiple users associated with a team of the group-based communication system. For example, when users perform actions in the group-based communication system, the computing device 505 may track the performed actions and may determine or generate the concurrency data based on the actions performed by multiple users (e.g., users corresponding to one or more teams). That is, the computing device 505 may store concurrency data based on user inputs to user devices, such as the user device 510-a, where the user inputs correspond to the actions within the group-based communication system. The concurrency data may indicate at least when multiple users are concurrently active in the group-based communication system. The actions performed within the group-based communication system may include typing a message, reacting to a message, selecting to view a group-based communication channel (e.g., a specific channel, a direct message, or another view within the group-based communication system), scrolling within the group-based communication system, selecting to view a user profile of a user of the group-based communication system, selecting a link (e.g., a hyperlink within a post or document), creating a group-based communication channel (e.g., a channel, a direct message), interacting with a file (e.g., typing in the file, reading the file), selecting an application window for the group-based communication system (e.g., maximizing or otherwise interacting with the window displaying the user interface for the group-based communication system), or any combination of these or other actions associated with the group-based communication system.

At 545, the computing device 505 may generate a classifier for a team. For example, the computing device 505 may use a machine learning model to generate the classifier for the team. The classifier may indicate whether the team is associated with a work team, an educational team, or a social team. The machine learning model may be trained based on first data that includes historical concurrency data for multiple teams of the group-based communication system and second data that includes team-specified classifiers for the multiple teams (e.g., specified in response to a survey message, as described herein). The machine learning model may be trained to learn relationships between the first data and the second data, such that the model may be configured to use the relationships to generate a classifier for a team upon input of features associated with the team. The features associated with the team may include the concurrency data for the team. Additionally, or alternatively, the features associated with the team and used as inputs to the machine learning model may include email address domain information for users associated with the team, activity information within the group-based communication system for users associated with the team, file types used by the team, privacy settings for one or more channels associated with the team, historical information indicating whether users of the team are associated with one or more other teams of the group-based communication system, pricing page visitation information for users of the team (e.g., to purchase an access plan for the team), checkout page visitation information for users of the team (e.g., including shopping cart abandoners), call activity for the team, meeting activity for the team, administrative user activity information for the team, a country or industry code for the team, or any combination of these or other team-specific features.

In some examples, at 550, the computing device 505 may determine one or more aspects of a message using a second machine learning model. The second machine learning model may be trained based on first data that includes historical access plan information for multiple teams (e.g., where an access plan defines a set of features of the group-based communication system available to a corresponding team) and second data that includes classifiers for the multiple teams. The machine learning model may be trained to learn relationships between the first data and the second data, such that the model may be configured to use the relationships to generate the one or more aspects of the message upon input of features associated with the team. In some cases, the computing device 505 may input the team classifier generated at 545 into the second machine learning model to output the one or more aspects of the message. In some examples, the computing device 505 (e.g., using the second machine learning model) may determine when to send the message, may determine contents of the message (e.g., a type of discount to offer, a trial plan to offer), or both. For example, the output of the second machine learning model may indicate whether to offer a discount to a team, a type of discount to offer to the team, a predicted likelihood that the team will pay for a feature of the group-based communication system, or any combination thereof.

At 555, the computing device 505 may send a message to at least one user of the team based on the classifier for the team (e.g., the classifier generated at 545). The message may be sent based on the one or more aspects determined at 550. The computing device 505 may send the message to a specific user of a team (e.g., an administrative user operating the user device 510-a) or may send the message to multiple users of the team (e.g., each user of the team). In some examples, the team may be associated with a first access plan for the group-based communication system. For example, the team may be subscribed to the first access plan, which defines a set of features of the group-based communication system available to the users of the team. The message may include a discount offer for a second access plan different from the first access plan. For example, the message may offer a discounted upgrade to a higher level of access (e.g., including additional or improved features) for the team. Additionally, or alternatively, the message may be associated with an A/B test, where the computing device 505 may perform the A/B test for a feature (e.g., a new or updated feature) of the group-based communication system and may determine results of the A/B test based on the classifier for the team. In some other cases, the message may provide training information or other information deemed relevant to users of teams based on the classification of the team.

Figure 6:
FIG. 6 illustrates a block diagram of an apparatus that supports classifying teams in a group-based communication system using machine learning techniques in accordance with aspects of the present disclosure.

FIG. 6 illustrates a block diagram 600 of a device 605 that supports classifying teams in a group-based communication system using machine learning techniques in accordance with aspects of the present disclosure. The device 605 may include an input component 610, an output component 615, and a team classifier manager 620. The device 605 may also include a processor. Each of these components may be in communication with one another (e.g., via one or more buses).

The input component 610 may manage input signals for the device 605. For example, the input component 610 may identify input signals based on an interaction with a modem, a keyboard, a mouse, a touchscreen, or a similar device. These input signals may be associated with user input or processing at other components or devices. In some cases, the input component 610 may utilize an operating system such as iOS®, ANDROID®, MS-DOS®, MS-WINDOWS®, OS/2®, UNIX®, LINUX®, or another known operating system to handle input signals. The input component 610 may send aspects of these input signals to other components of the device 605 for processing. For example, the input component 610 may transmit input signals to the team classifier manager 620 to support classifying teams in a group-based communication system using machine learning techniques. In some cases, the input component 610 may be a component of an input/output (I/O) controller 810 as described with reference to FIG. 8.

The output component 615 may manage output signals for the device 605. For example, the output component 615 may receive signals from other components of the device 605, such as the team classifier manager 620, and may transmit these signals to other components or devices. In some examples, the output component 615 may transmit output signals for display in a UI, for storage in a database or data store, for further processing at a server or server cluster, or for any other processes at any number of devices or systems. In some cases, the output component 615 may be a component of an I/O controller 810 as described with reference to FIG. 8.

For example, the team classifier manager 620 may include a concurrency data tracker 625, a classifier model component 630, a message component 635, or any combination thereof. In some examples, the team classifier manager 620, or various components thereof, may be configured to perform various operations (e.g., receiving, monitoring, transmitting) using or otherwise in cooperation with the input component 610, the output component 615, or both. For example, the team classifier manager 620 may receive information from the input component 610, send information to the output component 615, or be integrated in combination with the input component 610, the output component 615, or both to receive information, transmit information, or perform various other operations as described herein.

The team classifier manager 620 may support classifying teams in a group-based communication system in accordance with examples as disclosed herein. The concurrency data tracker 625 may be configured to support receiving concurrency data for a set of users associated with a team of the group-based communication system. The concurrency data may indicate at least when multiple users of the set of users are concurrently active in the group-based communication system. The classifier model component 630 may be configured to support generating, using a machine learning model, a classifier for the team. The classifier may indicate whether the team is associated with a work team, an educational team, or a social team. The machine learning model may be trained based on first data that includes historical concurrency data for a set of multiple teams of the group-based communication system and second data that includes team-specified classifiers for the set of multiple teams to learn relationships between the first data and the second data, such that the machine learning model is configured to use the relationships to generate the classifier for the team upon input of the concurrency data. The message component 635 may be configured to support sending a message to at least one user of the set of users associated with the team based on the classifier for the team.

Figure 7:
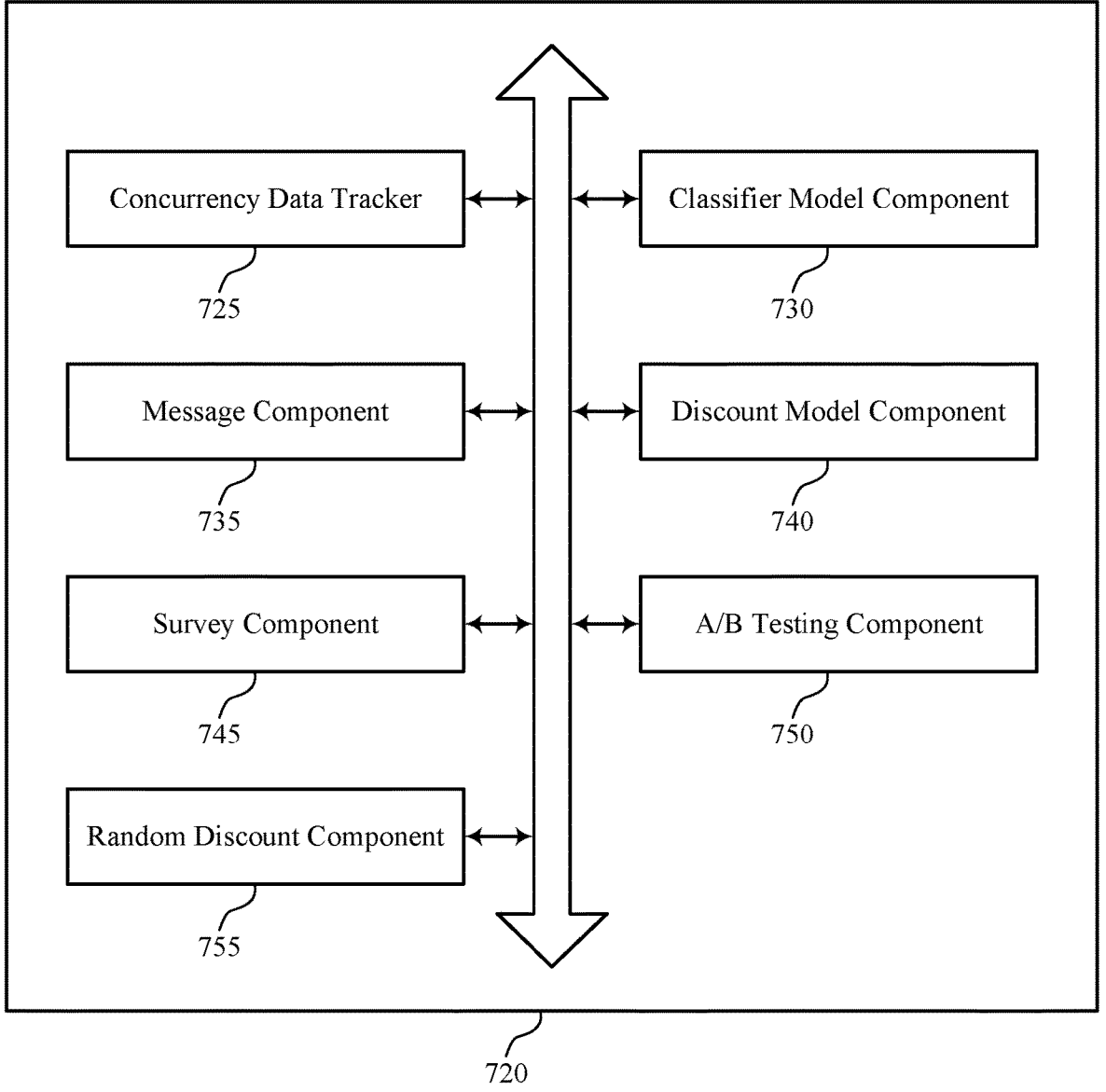
FIG. 7 illustrates a block diagram of a team classifier manager that supports classifying teams in a group-based communication system using machine learning techniques in accordance with aspects of the present disclosure.

FIG. 7 illustrates a block diagram 700 of a team classifier manager 720 that supports classifying teams in a group-based communication system using machine learning techniques in accordance with aspects of the present disclosure. The team classifier manager 720 may be an example of aspects of a team classifier manager 620 as described herein. The team classifier manager 720, or various components thereof, may be an example of means for performing various aspects of classifying teams in a group-based communication system using machine learning techniques as described herein. For example, the team classifier manager 720 may include a concurrency data tracker 725, a classifier model component 730, a message component 735, a discount model component 740, a survey component 745, an A/B testing component 750, a random discount component 755, or any combination thereof. Each of these components may communicate, directly or indirectly, with one another (e.g., via one or more buses).

The team classifier manager 720 may support classifying teams in a group-based communication system in accordance with examples as disclosed herein. The concurrency data tracker 725 may be configured to support receiving concurrency data for a set of multiple users associated with a team of the group-based communication system. The concurrency data may indicate at least when multiple users of the set of multiple users are concurrently active in the group-based communication system. The classifier model component 730 may be configured to support generating, using a machine learning model, a classifier for the team. The classifier may indicate whether the team is associated with a work team, an educational team, or a social team. Additionally, the machine learning model may be trained based on first data that includes historical concurrency data for a set of multiple teams of the group-based communication system and second data that includes team-specified classifiers for the set of multiple teams to learn relationships between the first data and the second data, such that the machine learning model is configured to use the relationships to generate the classifier for the team upon input of the concurrency data. The message component 735 may be configured to support sending a message to at least one user of the set of multiple users associated with the team based on the classifier for the team.

In some examples, the discount model component 740 may be configured to support generating, using a second machine learning model, one or more aspects of the message, where the message is sent to the at least one user of the set of multiple users associated with the team based on the one or more aspects of the message. The second machine learning model may be trained based on third data that includes historical access plan information for the set of multiple teams, where an access plan indicates a set of features of the group-based communication system available to a corresponding team. The second machine learning model may be further trained based on the second data that includes the team-specified classifiers for the set of multiple teams, to learn additional relationships between the third data and the second data, such that the second machine learning model is configured to use the additional relationships to generate the one or more aspects of the message upon input of the classifier for the team.

In some examples, to support sending the message, the discount model component 740 may be configured to support determining when to send the message based on the one or more aspects of the message. Additionally, or alternatively, in some examples, to support sending the message, the discount model component 740 may be configured to support determining contents of the message based on the one or more aspects of the message. In some examples, the contents includes a type of discount offered to the team, a trial plan offered to the team, or both. In some examples, the one or more aspects of the message indicate whether to offer a discount to the team, a type of discount to offer to the team, a predicted likelihood that the team will pay for a feature of the group-based communication system, or any combination thereof.

In some examples, the random discount component 755 may be configured to support determining a subset of teams from the set of multiple teams of the group-based communication system based on a random selection procedure. In some such examples, the random discount component 755 may be configured to support sending, to a set of users corresponding to the determined subset of teams, a discount message offering a discount for a respective team of the determined subset of teams, where the second machine learning model may be further trained based on which teams of the determined subset of teams use the discount in response to the discount message.

In some examples, the one or more aspects of the message are generated using the second machine learning model based on the classifier for the team indicating that the team is associated with the work team.

In some examples, the survey component 745 may be configured to support sending, to a set of users corresponding to the set of multiple teams of the group-based communication system, a survey message requesting information relating to classifications of the set of multiple teams. In some examples, the survey component 745 may be configured to support receiving, in response to the survey message, the information relating to the classifications of the set of multiple teams, where the team-specified classifiers for the set of multiple teams may be based on the information relating to the classifications of the set of multiple teams.

In some examples, the concurrency data tracker 725 may be configured to support storing the concurrency data based on a set of multiple user inputs to a set of multiple user devices operated by the set of multiple users associated with the team, where the set of multiple user inputs correspond to actions within the group-based communication system. In some examples, the actions within the group-based communication system may include typing a first message, reacting to a second message, selecting to view a first group-based communication channel, scrolling within a second group-based communication channel, selecting to view a user profile, selecting a link, creating a third group-based communication channel, interacting with a file, selecting an application window for the group-based communication system, or any combination thereof within the group-based communication system.

In some examples, the classifier for the team may be generated using the machine learning model further based on one or more features including email address domain information for the set of multiple users associated with the team, activity information within the group-based communication system for the set of multiple users associated with the team, file types used by the team, privacy settings for one or more group-based communication channels associated with the team, historical information indicating whether users of the set of multiple users are associated with one or more other teams of the group-based communication system, pricing page visitation information for the set of multiple users associated with the team, checkout page visitation information for the set of multiple users associated with the team, call activity for the team, meeting activity for the team, usage information for the group-based communication system of an administrative user of the team, a country code associated with the team, an industry code associated with the team, or any combination thereof.

In some examples, the A/B testing component 750 may be configured to support performing an A/B test for a feature of the group-based communication system. In some examples, the A/B testing component 750 may be configured to support determining results of the A/B test based on the classifier for the team.

In some examples, the team is associated with a first access plan of a set of multiple access plans for the group-based communication system, where an access plan of the set of multiple access plans indicates a set of features of the group-based communication system available to the team. In some examples, the message includes a discount offer for a second access plan of the set of multiple access plans for the group-based communication system.

In some examples, the team corresponds to a workspace in the group-based communication system, a group-based communication channel in the group-based communication system, or both. Additionally, or alternatively, in some examples, the at least one user of the set of multiple users associated with the team includes an administrative user of the team.

Figure 8:
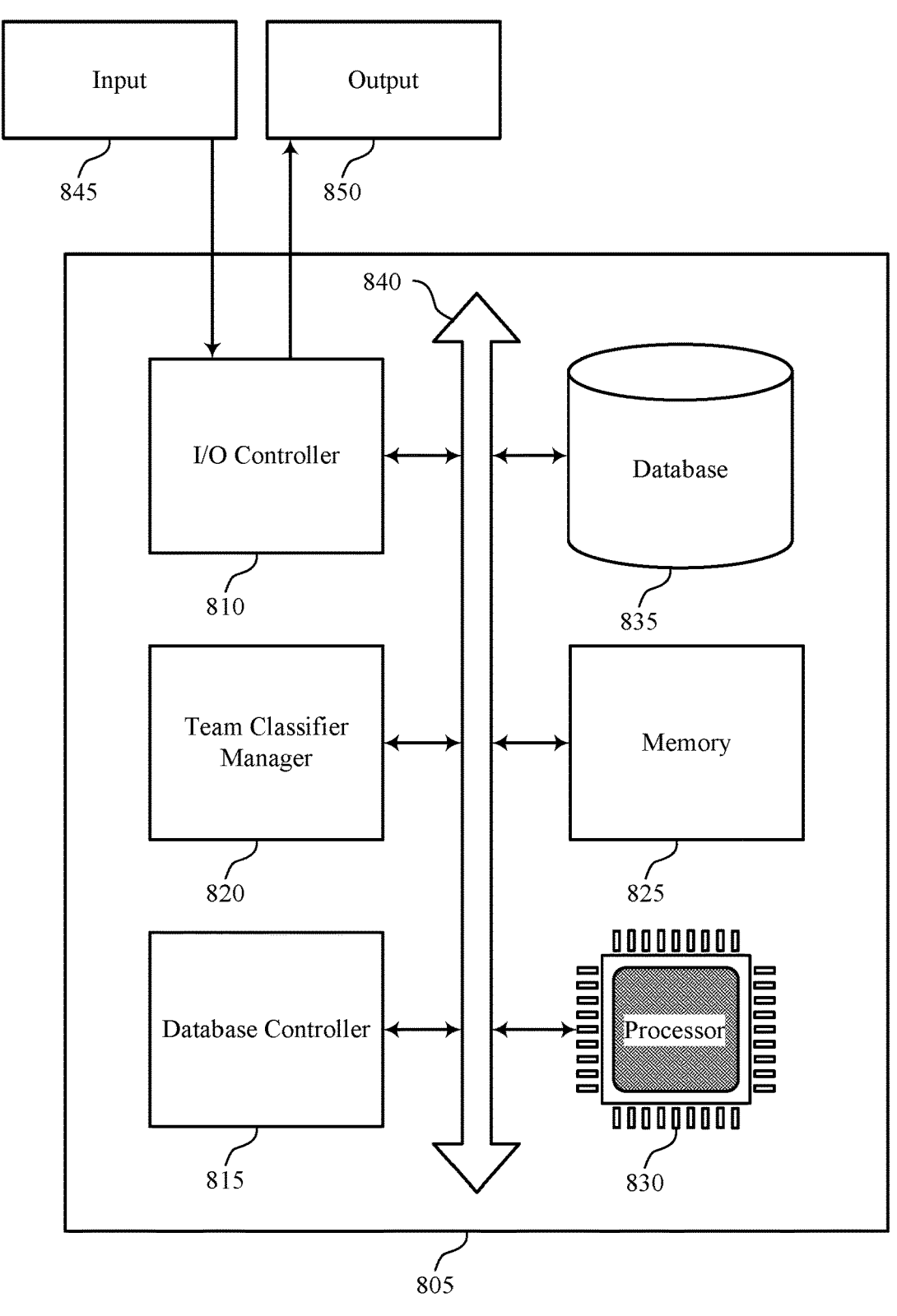
FIG. 8 illustrates a diagram of a system including a device that supports classifying teams in a group-based communication system using machine learning techniques in accordance with aspects of the present disclosure.

FIG. 8 illustrates a diagram of a system 800 including a device 805 that supports classifying teams in a group-based communication system using machine learning techniques in accordance with aspects of the present disclosure. The device 805 may be an example of or include the components of a device 605 as described herein. The device 805 may be an example of a component of a group-based communication system. For example, the device 805 may be a processing device supporting one or more aspects of a group-based communication platform, such as an application server, a database server, a cloud-based server or service, a worker server, a server cluster, a virtual machine, a container, a network device, a user device, or any combination of these or other computing devices. The device 805 may include components for bi-directional data communications including components for transmitting and receiving communications, such as a team classifier manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor 830 to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In some other cases, a memory controller may be integrated into the processor 830. The processor 830 may be configured to execute computer-readable instructions stored in a memory 825 to perform various functions (e.g., functions or tasks supporting classifying teams in a group-based communication system using machine learning techniques).

The team classifier manager 820 may support classifying teams in a group-based communication system in accordance with examples as disclosed herein. For example, the team classifier manager 820 may be configured to support receiving concurrency data for a set of multiple users associated with a team of the group-based communication system, the concurrency data indicating at least when multiple users of the set of multiple users are concurrently active in the group-based communication system. The team classifier manager 820 may be configured to support generating, using a machine learning model, a classifier for the team, the classifier indicating whether the team is associated with a work team, an educational team, or a social team. The machine learning model may be trained based on first data that includes historical concurrency data for a set of multiple teams of the group-based communication system and second data that includes team-specified classifiers for the set of multiple teams to learn relationships between the first data and the second data, such that the machine learning model is configured to use the relationships to generate the classifier for the team upon input of the concurrency data. The team classifier manager 820 may be configured to support sending a message to at least one user of the set of multiple users associated with the team based on the classifier for the team.

Figure 9:
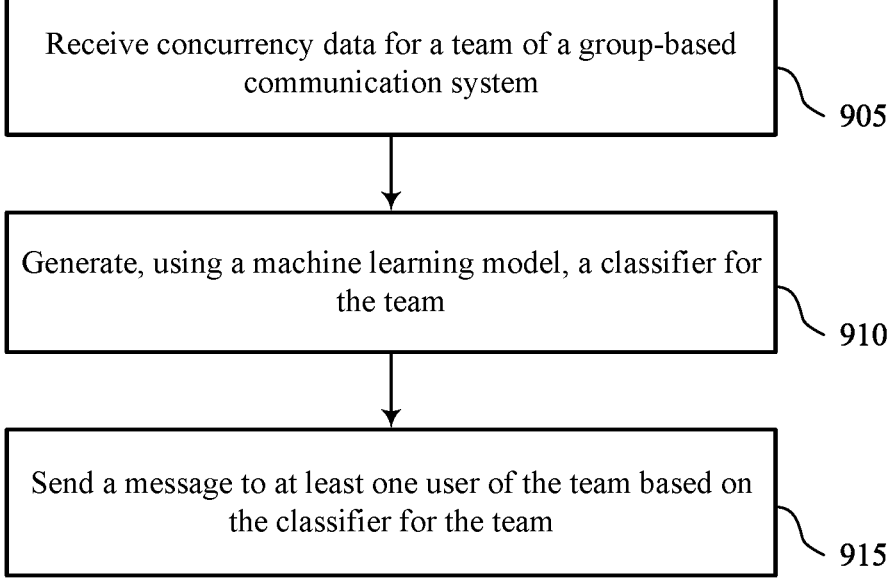
FIGS. 9 and 10 illustrate flowcharts showing methods that support classifying teams and determining discount messaging in a group-based communication system using machine learning techniques in accordance with aspects of the present disclosure.

FIG. 9 illustrates a flowchart showing a method 900 that supports classifying teams in a group-based communication system using machine learning techniques in accordance with aspects of the present disclosure. The operations of the method 900 may be implemented by a group-based communication system or its components (e.g., a processing device, such as an application server, a database server, a cloud-based server or service, a worker server, a server cluster, a virtual machine, a container, a network device, a user device, or any combination of these or other computing devices) as described herein. For example, the operations of the method 900 may be performed by a group-based communication system as described with reference to FIGS. 1 through 8. In some examples, the group-based communication system may execute a set of instructions to control the functional elements of the group-based communication system to perform the described functions. Additionally, or alternatively, the group-based communication system may perform aspects of the described functions using special-purpose hardware.

At 905, the method may include receiving concurrency data for a set of users associated with a team of the group-based communication system. The concurrency data may indicate at least when multiple users of the set of users are concurrently active in the group-based communication system. The operations of 905 may be performed in accordance with examples as disclosed herein. In some examples, aspects of the operations of 905 may be performed by a concurrency data tracker 725 as described with reference to FIG. 7.

At 910, the method may include generating, using a machine learning model, a classifier for the team. The classifier for the team may indicate whether the team is associated with a work team, an educational team, or a social team. The operations of 910 may be performed in accordance with examples as disclosed herein. In some examples, aspects of the operations of 910 may be performed by a classifier model component 730 as described with reference to FIG. 7.

The machine learning model may have been trained based on first data that includes historical concurrency data for a set of multiple teams of the group-based communication system and second data that includes team-specified classifiers for the set of multiple teams. The machine learning model may have been trained to learn relationships between the first data and the second data, such that the machine learning model is configured to use the relationships to generate a classifier for a team upon input of at least concurrency data for the team (e.g., in addition to one or more other features associated with the team).

At 915, the method may include sending a message to at least one user of the set of users associated with the team based on the classifier for the team. The operations of 915 may be performed in accordance with examples as disclosed herein. In some examples, aspects of the operations of 915 may be performed by a message component 735 as described with reference to FIG. 7.

Figure 10:
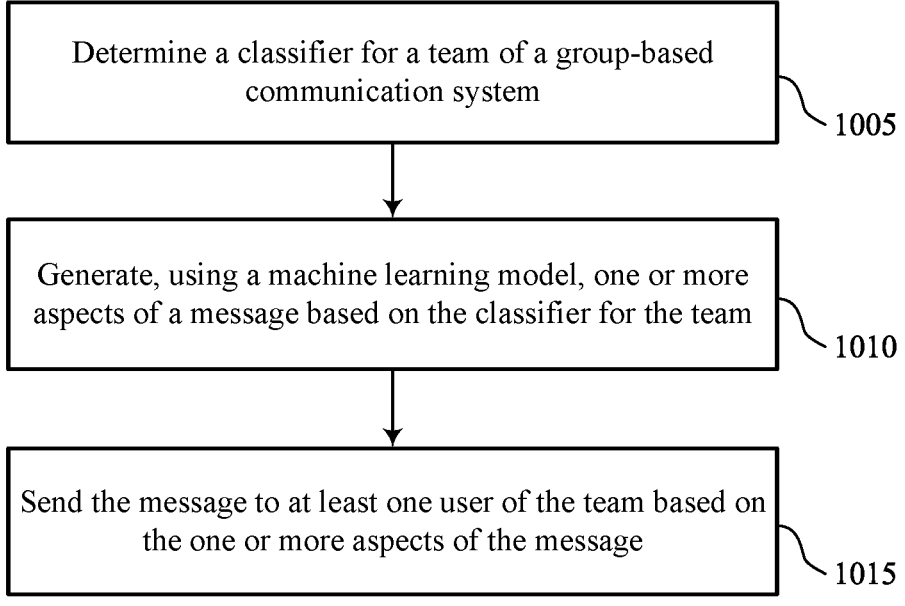

FIG. 10 illustrates a flowchart showing a method 1000 that supports determining discount messaging in a group-based communication system using machine learning techniques in accordance with aspects of the present disclosure. The operations of the method 1000 may be implemented by a group-based communication system or its components (e.g., a processing device, such as an application server, a database server, a cloud-based server or service, a worker server, a server cluster, a virtual machine, a container, a network device, a user device, or any combination of these or other computing devices) as described herein. For example, the operations of the method 1000 may be performed by a group-based communication system as described with reference to FIGS. 1 through 8. In some examples, the group-based communication system may execute a set of instructions to control the functional elements of the group-based communication system to perform the described functions. Additionally, or alternatively, the group-based communication system may perform aspects of the described functions using special-purpose hardware.

At 1005, the method may include determining a classifier for a team of a group-based communication system. In some examples, the method may include determining the classifier using a machine learning model, as described herein with reference to FIG. 9. The operations of 1005 may be performed in accordance with examples as disclosed herein. In some examples, aspects of the operations of 1005 may be performed by a concurrency data tracker 725, a classifier model component 730, or a combination thereof as described with reference to FIG. 7.

At 1010, the method may include generating, using a machine learning model (e.g., a second machine learning model), one or more aspects of a message based on the classifier for the team. The machine learning model may be trained based on first data that includes historical access plan information for a set of multiple teams, where an access plan indicates a set of features of the group-based communication system available to a corresponding team. The machine learning model may be further trained based on second data that includes team-specified classifiers for the set of multiple teams in order to learn relationships between the first data and the second data, such that the machine learning model is configured to use the relationships to generate the one or more aspects of the message upon input of the classifier for the team. The operations of 1010 may be performed in accordance with examples as disclosed herein. In some examples, aspects of the operations of 1010 may be performed by a discount model component 740 as described with reference to FIG. 7.

At 1015, the method may include sending the message to at least one user of a set of users associated with the team based on the classifier for the team and the one or more aspects of the message. The operations of 1015 may be performed in accordance with examples as disclosed herein. In some examples, aspects of the operations of 1015 may be performed by a message component 735 as described with reference to FIG. 7.

A method for classifying teams in a group-based communication system is described. The method may include receiving concurrency data for a set of multiple users associated with a team of the group-based communication system, the concurrency data indicating at least when multiple users of the set of multiple users are concurrently active in the group-based communication system. The method may further include generating, using a machine learning model, a classifier for the team, the classifier indicating whether the team is associated with a work team, an educational team, or a social team, and where the machine learning model is trained based on: first data that includes historical concurrency data for a set of multiple teams of the group-based communication system; and second data that includes team-specified classifiers for the set of multiple teams, to learn relationships between the first data and the second data, such that the machine learning model is configured to use the relationships to generate the classifier for the team upon input of the concurrency data. The method may further include sending a message to at least one user of the set of multiple users associated with the team based on the classifier for the team.

An apparatus for classifying teams in a group-based communication system is described. The apparatus may include a processor, memory coupled with the processor, and instructions stored in the memory. The instructions may be executable by the processor to cause the apparatus to receive concurrency data for a set of multiple users associated with a team of the group-based communication system, the concurrency data indicating at least when multiple users of the set of multiple users are concurrently active in the group-based communication system. The instructions may be further executable by the processor to cause the apparatus to generate, using a machine learning model, a classifier for the team, the classifier indicating whether the team is associated with a work team, an educational team, or a social team, and where the machine learning model is trained based on: first data that include historical concurrency data for a set of multiple teams of the group-based communication system; and second data that include team-specified classifiers for the set of multiple teams, to learn relationships between the first data and the second data, such that the machine learning model is configured to use the relationships to generate the classifier for the team upon input of the concurrency data. The instructions may be further executable by the processor to cause the apparatus to send a message to at least one user of the set of multiple users associated with the team based on the classifier for the team.

Another apparatus for classifying teams in a group-based communication system is described. The apparatus may include means for receiving concurrency data for a set of multiple users associated with a team of the group-based communication system, the concurrency data indicating at least when multiple users of the set of multiple users are concurrently active in the group-based communication system. The apparatus may further include means for generating, using a machine learning model, a classifier for the team, the classifier indicating whether the team is associated with a work team, an educational team, or a social team, and where the machine learning model is trained based on: first data that includes historical concurrency data for a set of multiple teams of the group-based communication system; and second data that includes team-specified classifiers for the set of multiple teams, to learn relationships between the first data and the second data, such that the machine learning model is configured to use the relationships to generate the classifier for the team upon input of the concurrency data. The apparatus may further include means for sending a message to at least one user of the set of multiple users associated with the team based on the classifier for the team.

A non-transitory computer-readable medium storing code for classifying teams in a group-based communication system is described. The code may include instructions executable by a processor to receive concurrency data for a set of multiple users associated with a team of the group-based communication system, the concurrency data indicating at least when multiple users of the set of multiple users are concurrently active in the group-based communication system. The code may include instructions further executable by the processor to generate, using a machine learning model, a classifier for the team, the classifier indicating whether the team is associated with a work team, an educational team, or a social team, and where the machine learning model is trained based on: first data that include historical concurrency data for a set of multiple teams of the group-based communication system; and second data that include team-specified classifiers for the set of multiple teams, to learn relationships between the first data and the second data, such that the machine learning model is configured to use the relationships to generate the classifier for the team upon input of the concurrency data. The code may include instructions further executable by the processor to send a message to at least one user of the set of multiple users associated with the team based on the classifier for the team.

Some examples of the method, apparatuses, and non-transitory computer-readable medium described herein may further include operations, features, means, or instructions for generating, using a second machine learning model, one or more aspects of the message, where the message may be sent to the at least one user of the set of multiple users associated with the team based on the one or more aspects of the message. The second machine learning model may be trained based on: third data that includes historical access plan information for the set of multiple teams, where an access plan indicates a set of features of the group-based communication system available to a corresponding team; and the second data that includes the team-specified classifiers for the set of multiple teams to learn additional relationships between the third data and the second data, such that the second machine learning model may be configured to use the additional relationships to generate the one or more aspects of the message upon input of the classifier for the team.

In some examples of the method, apparatuses, and non-transitory computer-readable medium described herein, sending the message may include operations, features, means, or instructions for determining when to send the message based on the one or more aspects of the message. In some examples of the method, apparatuses, and non-transitory computer-readable medium described herein, sending the message may include operations, features, means, or instructions for determining contents of the message based on the one or more aspects of the message. In some examples of the method, apparatuses, and non-transitory computer-readable medium described herein, the contents may include a type of discount offered to the team, a trial plan offered to the team, or both. In some examples of the method, apparatuses, and non-transitory computer-readable medium described herein, the one or more aspects of the message indicate whether to offer a discount to the team, a type of discount to offer to the team, a predicted likelihood that the team will pay for a feature of the group-based communication system, or any combination thereof.

Some examples of the method, apparatuses, and non-transitory computer-readable medium described herein may further include operations, features, means, or instructions for determining a subset of teams from the set of multiple teams of the group-based communication system based on a random selection procedure and sending, to a set of users corresponding to the determined subset of teams, a discount message offering a discount for a respective team of the determined subset of teams, where the second machine learning model may be further trained based on which teams of the determined subset of teams use the discount in response to the discount message.

In some examples of the method, apparatuses, and non-transitory computer-readable medium described herein, the one or more aspects of the message may be generated using the second machine learning model based on the classifier for the team indicating that the team may be associated with the work team.

Some examples of the method, apparatuses, and non-transitory computer-readable medium described herein may further include operations, features, means, or instructions for sending, to a set of users corresponding to the set of multiple teams of the group-based communication system, a survey message requesting information relating to classifications of the set of multiple teams and receiving, in response to the survey message, the information relating to the classifications of the set of multiple teams, where the team-specified classifiers for the set of multiple teams may be based on the information relating to the classifications of the set of multiple teams.

Some examples of the method, apparatuses, and non-transitory computer-readable medium described herein may further include operations, features, means, or instructions for storing the concurrency data based on a set of multiple user inputs to a set of multiple user devices operated by the set of multiple users associated with the team, where the set of multiple user inputs correspond to actions within the group-based communication system. In some examples of the method, apparatuses, and non-transitory computer-readable medium described herein, the actions within the group-based communication system include typing a first message, reacting to a second message, selecting to view a first group-based communication channel, scrolling within a second group-based communication channel, selecting to view a user profile, selecting a link, creating a third group-based communication channel, interacting with a file, selecting an application window for the group-based communication system, or any combination thereof within the group-based communication system.

In some examples of the method, apparatuses, and non-transitory computer-readable medium described herein, the classifier for the team may be generated using the machine learning model further based on one or more features including email address domain information for the set of multiple users associated with the team, activity information within the group-based communication system for the set of multiple users associated with the team, file types used by the team, privacy settings for one or more group-based communication channels associated with the team, historical information indicating whether users of the set of multiple users may be associated with one or more other teams of the group-based communication system, pricing page visitation information for the set of multiple users associated with the team, checkout page visitation information for the set of multiple users associated with the team, call activity for the team, meeting activity for the team, usage information for the group-based communication system of an administrative user of the team, a country code associated with the team, an industry code associated with the team, or any combination thereof.

Some examples of the method, apparatuses, and non-transitory computer-readable medium described herein may further include operations, features, means, or instructions for performing an A/B test for a feature of the group-based communication system and determining results of the A/B test based on the classifier for the team.

In some examples of the method, apparatuses, and non-transitory computer-readable medium described herein, the team may be associated with a first access plan of a set of multiple access plans for the group-based communication system, an access plan of the set of multiple access plans indicating a set of features of the group-based communication system available to the team, and the message includes a discount offer for a second access plan of the set of multiple access plans for the group-based communication system.

In some examples of the method, apparatuses, and non-transitory computer-readable medium described herein, the team corresponds to a workspace in the group-based communication system, a group-based communication channel in the group-based communication system, or both. In some examples of the method, apparatuses, and non-transitory computer-readable medium described herein, the at least one user of the set of multiple users associated with the team includes an administrative user of the team.

The following provides an overview of aspects of the present disclosure:

Aspect 1: A method for classifying teams in a group-based communication system, comprising: receiving concurrency data for a plurality of users associated with a team of the group-based communication system, the concurrency data indicating at least when multiple users of the plurality of users are concurrently active in the group-based communication system; generating, using a machine learning model, a classifier for the team, the classifier indicating whether the team is associated with a work team, an educational team, or a social team, and wherein the machine learning model is trained based at least in part on: first data that includes historical concurrency data for a plurality of teams of the group-based communication system, and second data that includes team-specified classifiers for the plurality of teams, to learn relationships between the first data and the second data, such that the machine learning model is configured to use the relationships to generate the classifier for the team upon input of the concurrency data; and sending a message to at least one user of the plurality of users associated with the team based at least in part on the classifier for the team.

Aspect 2: The method of aspect 1, further comprising: generating, using a second machine learning model, one or more aspects of the message, wherein the message is sent to the at least one user of the plurality of users associated with the team based at least in part on the one or more aspects of the message, and wherein the second machine learning model is trained based at least in part on: third data that includes historical access plan information for the plurality of teams, wherein an access plan indicates a set of features of the group-based communication system available to a corresponding team, and the second data that includes the team-specified classifiers for the plurality of teams, to learn additional relationships between the third data and the second data, such that the second machine learning model is configured to use the additional relationships to generate the one or more aspects of the message upon input of the classifier for the team.

Aspect 3: The method of aspect 2, wherein sending the message further comprises: determining when to send the message based at least in part on the one or more aspects of the message.

Aspect 4: The method of any of aspects 2 through 3, wherein sending the message further comprises: determining contents of the message based at least in part on the one or more aspects of the message.

Aspect 5: The method of aspect 4, wherein the contents comprises a type of discount offered to the team, a trial plan offered to the team, or both.

Aspect 6: The method of any of aspects 2 through 5, wherein the one or more aspects of the message indicate whether to offer a discount to the team, a type of discount to offer to the team, a predicted likelihood that the team will pay for a feature of the group-based communication system, or any combination thereof.

Aspect 7: The method of any of aspects 2 through 6, further comprising: determining a subset of teams from the plurality of teams of the group-based communication system based at least in part on a random selection procedure; and sending, to a set of users corresponding to the determined subset of teams, a discount message offering a discount for a respective team of the determined subset of teams, wherein the second machine learning model is further trained based at least in part on which teams of the determined subset of teams use the discount in response to the discount message.

Aspect 8: The method of any of aspects 2 through 7, wherein the one or more aspects of the message are generated using the second machine learning model based at least in part on the classifier for the team indicating that the team is associated with the work team.

Aspect 9: The method of any of aspects 1 through 8, further comprising: sending, to a set of users corresponding to the plurality of teams of the group-based communication system, a survey message requesting information relating to classifications of the plurality of teams; and receiving, in response to the survey message, the information relating to the classifications of the plurality of teams, wherein the team-specified classifiers for the plurality of teams are based on the information relating to the classifications of the plurality of teams.

Aspect 10: The method of any of aspects 1 through 9, further comprising: storing the concurrency data based at least in part on a plurality of user inputs to a plurality of user devices operated by the plurality of users associated with the team, wherein the plurality of user inputs correspond to actions within the group-based communication system.

Aspect 11: The method of aspect 10, wherein the actions within the group-based communication system comprise typing a first message, reacting to a second message, selecting to view a first group-based communication channel, scrolling within a second group-based communication channel, selecting to view a user profile, selecting a link, creating a third group-based communication channel, interacting with a file, selecting an application window for the group-based communication system, or any combination thereof within the group-based communication system.

Aspect 12: The method of any of aspects 1 through 11, wherein the classifier for the team is generated using the machine learning model further based at least in part on one or more features comprising email address domain information for the plurality of users associated with the team, activity information within the group-based communication system for the plurality of users associated with the team, file types used by the team, privacy settings for one or more group-based communication channels associated with the team, historical information indicating whether users of the plurality of users are associated with one or more other teams of the group-based communication system, pricing page visitation information for the plurality of users associated with the team, checkout page visitation information for the plurality of users associated with the team, call activity for the team, meeting activity for the team, usage information for the group-based communication system of an administrative user of the team, a country code associated with the team, an industry code associated with the team, or any combination thereof.

Aspect 13: The method of any of aspects 1 through 12, further comprising: performing an A/B test for a feature of the group-based communication system; and determining results of the A/B test based at least in part on the classifier for the team.

Aspect 14: The method of any of aspects 1 through 13, wherein the team is associated with a first access plan of a plurality of access plans for the group-based communication system, an access plan of the plurality of access plans indicating a set of features of the group-based communication system available to the team; and the message comprises a discount offer for a second access plan of the plurality of access plans for the group-based communication system.

Aspect 15: The method of any of aspects 1 through 14, wherein the team corresponds to a workspace in the group-based communication system, a group-based communication channel in the group-based communication system, or both.

Aspect 16: The method of any of aspects 1 through 15, wherein the at least one user of the plurality of users associated with the team comprises an administrative user of the team.

Aspect 17: An apparatus for classifying teams in a group-based communication system, comprising a processor; memory coupled with the processor; and instructions stored in the memory and executable by the processor to cause the apparatus to perform a method of any of aspects 1 through 16.

Aspect 18: An apparatus for classifying teams in a group-based communication system, comprising at least one means for performing a method of any of aspects 1 through 16.

Aspect 19: A non-transitory computer-readable medium storing code for classifying teams in a group-based communication system, the code comprising instructions executable by a processor to perform a method of any of aspects 1 through 16.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for classifying teams in a group-based communication system, comprising:

receiving concurrency data for a plurality of users associated with a team of the group-based communication system, the concurrency data indicating at least when multiple users of the plurality of users are concurrently active in the group-based communication system;

training a first machine learning model based at least in part on first data that includes historical concurrency data for a plurality of teams of the group-based communication system and second data that includes team-specified classifiers for the plurality of teams, wherein the first machine learning model learns relationships between the first data and the second data based at least in part on the training;

generating, using the first machine learning model and the relationships between the first data and the second data, a classifier for the team based at least in part on the received concurrency data for the plurality of users associated with the team, the classifier indicating whether the team is associated with a work team, an educational team, or a social team;

training a second machine learning model based at least in part on third data that includes historical access plan information for the plurality of teams and the second data, wherein an access plan indicates a set of features of the group-based communication system available to a corresponding team, and wherein the second machine learning model learns additional relationships between the third data and the second data based at least in part on the training;

generating, using the second machine learning model and the additional relationships, one or more aspects of a message based at least in part on the classifier for the team generated by the first machine learning model; and sending the message comprising the one or more aspects to at least one user of the plurality of users associated with the team based at least in part on the classifier for the team.

2. The method of claim 1, wherein sending the message further comprises:

determining when to send the message based at least in part on the one or more aspects of the message.

3. The method of claim 1, wherein sending the message further comprises:

determining contents of the message based at least in part on the one or more aspects of the message.

4. The method of claim 3, wherein the contents comprises a type of discount offered to the team, a trial plan offered to the team, or both.

5. The method of claim 1, wherein the one or more aspects of the message indicate whether to offer a discount to the team, a type of discount to offer to the team, a predicted likelihood that the team will pay for a feature of the group-based communication system, or any combination thereof.

6. The method of claim 1, further comprising:

determining a subset of teams from the plurality of teams of the group-based communication system based at least in part on a random selection procedure; and sending, to a set of users corresponding to the determined subset of teams, a discount message offering a discount for a respective team of the determined subset of teams, wherein the second machine learning model is further trained based at least in part on which teams of the determined subset of teams use the discount in response to the discount message.

7. The method of claim 1, wherein the one or more aspects of the message are generated using the second machine learning model based at least in part on the classifier for the team indicating that the team is associated with the work team.

8. The method of claim 1, further comprising:

sending, to a set of users corresponding to the plurality of teams of the group-based communication system, a survey message requesting information relating to classifications of the plurality of teams; and receiving, in response to the survey message, the infor-
mation relating to the classifications of the plurality of
teams, wherein the team-specified classifiers for the
plurality of teams are based on the information relating
to the classifications of the plurality of teams.

9. The method of claim 1, further comprising:
storing the concurrency data based at least in part on a
plurality of user inputs to a plurality of user devices
operated by the plurality of users associated with the
team, wherein the plurality of user inputs correspond to
actions within the group-based communication system.

10. The method of claim 9, wherein the actions within the
group-based communication system comprise typing a first
message, reacting to a second message, selecting to view a
first group-based communication channel, scrolling within a
second group-based communication channel, selecting to
view a user profile, selecting a link, creating a third group-
based communication channel, interacting with a file, select-
ing an application window for the group-based communi-
cation system, or any combination thereof within the group-
based communication system.

11. The method of claim 1, wherein the classifier for the
team is generated using the machine learning model further
based at least in part on one or more features comprising
email address domain information for the plurality of users
associated with the team, activity information within the
group-based communication system for the plurality of users
associated with the team, file types used by the team, privacy
settings for one or more group-based communication chan-
nels associated with the team, historical information indi-
cating whether users of the plurality of users are associated
with one or more other teams of the group-based commu-
nication system, pricing page visitation information for the
plurality of users associated with the team, checkout page
visitation information for the plurality of users associated
with the team, call activity for the team, meeting activity for
the team, usage information for the group-based communi-
cation system of an administrative user of the team, a
country code associated with the team, an industry code
associated with the team, or any combination thereof.

12. The method of claim 1, further comprising:
performing an A/B test for a feature of the group-based
communication system; and
determining results of the A/B test based at least in part on
the classifier for the team.

13. The method of claim 1, wherein:
the team is associated with a first access plan of a plurality
of access plans for the group-based communication
system, an access plan of the plurality of access plans
indicating a set of features of the group-based commu-
nication system available to the team; and
the message comprises a discount offer for a second
access plan of the plurality of access plans for the
group-based communication system.

14. The method of claim 1, wherein the team corresponds
to a workspace in the group-based communication system,
a group-based communication channel in the group-based
communication system, or both.

15. The method of claim 1, wherein the at least one user
of the plurality of users associated with the team comprises
an administrative user of the team.

16. An apparatus for classifying teams in a group-based
communication system, comprising:
a processor;
memory coupled with the processor; and
instructions stored in the memory and executable by the
processor to cause the apparatus to:

receive concurrency data for a plurality of users asso-
ciated with a team of the group-based communica-
tion system, the concurrency data indicating at least
when multiple users of the plurality of users are
concurrently active in the group-based communica-
tion system;
train a first machine learning model based at least in
part on first data that includes historical concurrency
data for a plurality of teams of the group-based
communication system and second data that includes
team-specified classifiers for the plurality of teams,
wherein the first machine learning model learns
relationships between the first data and the second
data based at least in part on the training;
generate, using the first machine learning model and
the relationships between the first data and the sec-
ond data, a classifier for the team based at least in
part on the received concurrency data for the plural-
ity of users associated with the team, the classifier
indicating whether the team is associated with a
work team, an educational team, or a social team;
train a second machine learning model based at least in
part on third data that includes historical access plan
information for the plurality of teams and the second
data, wherein an access plan indicates a set of
features of the group-based communication system
available to a corresponding team, and wherein the
second machine learning model learns additional
relationships between the third data and the second
data based at least in part on the training;
generate, using the second machine learning model and
the additional relationships, one or more aspects of a
message based at least in part on the classifier for the
team generated by the first machine learning model;
and
send the message comprising the one or more aspects
to at least one user of the plurality of users associated
with the team based at least in part on the classifier
for the team.

17. The apparatus of claim 16, wherein the instructions
are further executable by the processor to cause the appa-
ratus to:
send, to a set of users corresponding to the plurality of
teams of the group-based communication system, a
survey message requesting information relating to clas-
sifications of the plurality of teams; and
receive, in response to the survey message, the informa-
tion relating to the classifications of the plurality of
teams, wherein the team-specified classifiers for the
plurality of teams are based on the information relating
to the classifications of the plurality of teams.

18. A non-transitory computer-readable medium storing
code for classifying teams in a group-based communication
system, the code comprising instructions executable by a
processor to:
receive concurrency data for a plurality of users associ-
ated with a team of the group-based communication
system, the concurrency data indicating at least when
multiple users of the plurality of users are concurrently
active in the group-based communication system;
train a first machine learning model based at least in part
on first data that includes historical concurrency data
for a plurality of teams of the group-based communi-
cation system and second data that includes team-
specified classifiers for the plurality of teams, wherein the first machine learning model learns relationships between the first data and the second data based at least in part on the training;

generate, using the first machine learning model and the relationships between the first data, a classifier for the team based at least in part on the received concurrency data for the plurality of users associated with the team, the classifier indicating whether the team is associated with a work team, an educational team, or a social team;

train a second machine learning model based at least in part on third data that includes historical access plan information for the plurality of teams and the second data, wherein an access plan indicates a set of features of the group-based communication system available to a corresponding team, wherein the second machine learning model learns additional relationships between the third data and the second data based at least in part on the training;

generate, using the second machine learning model and the additional relationships, one or more aspects of a message based at least in part on the classifier for the team generated by the first machine learning model; and send the message comprising the one or more aspects to at least one user of the plurality of users associated with the team based at least in part on the classifier for the team.

\* \* \* \* \*